United States Patent [19]

McAlister et al.

[11] Patent Number: 4,670,242

[45] Date of Patent: * Jun. 2, 1987

[54] HEAT RECOVERY FROM CONCENTRATED SULFURIC ACID

[75] Inventors: Donald R. McAlister, Ballwin, Mo.; Steven A. Ziebold, Waterloo, Ill.

[73] Assignee: Monsanto Company, St. Louis, Mo.

[*] Notice: The portion of the term of this patent subsequent to Mar. 18, 2003 has been disclaimed.

[21] Appl. No.: 669,971

[22] Filed: Nov. 9, 1984

[51] Int. Cl.[4] .............. C01B 17/98; C01B 17/74; C01B 17/48; C22C 38/40
[52] U.S. Cl. .................. 423/522; 423/531; 423/532; 422/160; 422/161
[58] Field of Search ......... 423/522, 533, 531, 532; 422/160, 161

[56] References Cited

U.S. PATENT DOCUMENTS

| | | | |
|---|---|---|---|
| 2,017,676 | 10/1935 | Von Girsewald . | |
| 2,071,598 | 2/1937 | Von Girsewald | 423/522 |
| 2,199,691 | 5/1940 | Carter | 422/161 |
| 3,525,586 | 4/1970 | Drechsel | 423/522 |
| 3,649,187 | 3/1972 | Fisher | 423/522 |
| 3,656,900 | 4/1972 | Drechsel | 423/522 |
| 3,788,043 | 1/1974 | Dorr et al. | 423/522 |
| 3,950,493 | 4/1976 | Dorr et al. | 423/522 |
| 4,123,107 | 10/1978 | Bryant et al. | 423/522 |
| 4,251,715 | 2/1981 | Petersson et al. | 423/531 |
| 4,330,364 | 5/1982 | Blumrich et al. | 423/531 |
| 4,368,183 | 1/1983 | Dorr | 423/532 |

FOREIGN PATENT DOCUMENTS

| | | | |
|---|---|---|---|
| 1139818 | 11/1962 | Fed. Rep. of Germany | 423/522 |
| 2529709 | 1/1977 | Fed. Rep. of Germany | 423/522 |
| 3018664 | 12/1980 | Fed. Rep. of Germany | 423/529 |
| 1385698 | 12/1983 | France | 423/522 |
| 471653 | 9/1937 | United Kingdom | 423/522 |
| 1128435 | 9/1968 | United Kingdom | 423/522 |
| 1152385 | 5/1969 | United Kingdom | 423/522 |
| 1175055 | 12/1969 | United Kingdom . | |
| 1280624 | 7/1972 | United Kingdom | 423/531 |
| 1534926 | 12/1978 | United Kingdom | 423/522 |
| 1553307 | 9/1979 | United Kingdom . | |
| 1554764 | 10/1979 | United Kingdom | 423/522 |
| 1589945 | 5/1981 | United Kingdom . | |
| 687160 | 2/1983 | United Kingdom | 423/522 |
| 2122594 | 1/1984 | United Kingdom | 423/522 |

OTHER PUBLICATIONS

Michels et al, "How to Rate Alloys for $SO_2$ Scrubbers," Chemical Engineering, Jun. 5, 1978, pp. 161–166.
Browder, "Improvements in Sulfuric Processes," CEP Mar. 1977, pp. 70–76.
Sanicro 28 Isocorrosion Curve by Sandvik Corp.
Sander & Beckman, "Concentration of Dilute Sulfuric Acid and Phosphoric Acid with Waste Heat," paper 25, *Making the Most of Sulphuric Acid*, Proceedings of British Sulfur Corp.'s 5th International Conference, Part II: Additional Papers and Discussions; London, Nov. 16–18, 1981.
Clayton et al, "Engineering Materials for Pumps and Valves," *Chemical Engineering Progress*, pp. 54–57, Sep. 1978.
Moyer letter to J. R. Donovan of Monsanto Envirochem Systems, Inc.
David W. McDowell, "Handling of Sulfuric Acid," *Chemical Engineering*, Nov. 11, 1974, p. 123.
Brink et al, "Mist Eliminators for Sulfuric Acid Plants," CEP Manual, A.I.Ch.E., New York (1971).

(List continued on next page.)

*Primary Examiner*—Gary P. Straub
*Attorney, Agent, or Firm*—Lawrence L. Limpus; John K. Roedel, Jr.

[57] ABSTRACT

A method and apparatus for the recovery of heat from a sulfuric acid process are provided. Sulfur trioxide is absorbed into hot concentrated sulfuric acid, acid having a concentration greater than 98% and less than 101% and a temperature greater than 120° C., in a heat recovery tower and the heat created by the exothermic reaction is recovered in a useful form in a heat exchanger.

61 Claims, 15 Drawing Figures

OTHER PUBLICATIONS

Sander, "Sulfuric Acid Plant Operations: Waste Heat Recovery in Sulfuric Acid Plants," *CEP*, Mar. 1977, pp. 61-64.

E-Brite Alloy Bulletin, Allegheny Ludlum (1980).

J. M. Viebrock, "Corrosion of Type 304 Stainless Steel in Mixed Anhydrous Nitric and Sulfuric Acids," *Corrosion*, vol. 25, No. 9, pp. 371-378 (Sep. 69).

Diagram, "Ferralium Alloy 255 Bulletin," Cabot Wrought Products Division (1983) p. 11.

Fasullo, "Use and Handling of Sulfuric Acid," (McGraw-Hill 1965), p. 67.

International Nickel Company Corrosion Engineering Bulletin CEB-1 (Jan. 83).

E-Brite 26-1 Bulletin, Airco Vacuum Metals Co. (1975).

Cabat Corporation Bulletin, "Corrosion Resistance of Hastelloy Alloys, 1980.

HEAT RECOVERY FROM CONCENTRATED SULFURIC ACID

CROSS-REFERENCE TO RELATED APPLICATION

This application is a continuation-in-part of Ser. No. 510,527 filed July 5, 1983, now U.S. Pat. No. 4,576,813.

BACKGROUND OF THE INVENTION

This invention relates to a process for the recovery of heat from a sulfuric acid plant. More particularly, this invention relates to a process for the recovery of the exothermic heat resulting from the absorption of sulfur trioxide into concentrated sulfuric acid. This invention also relates to a heat recovery tower which is used to recover the heat energy from concentrated sulfuric acid.

DESCRIPTION OF THE PRIOR ART

The process for the manufacture of sulfuric acid starts with a gas stream which contains sulfur dioxide. The sulfur dioxide is catalytically oxidized in a converter to sulfur trioxide which is removed from the gas stream in one or more absorption stages to form sulfuric acid. The oxidation of sulfur dioxide to sulfur trioxide is an exothermic reaction. To prevent the loss of this heat, steam has been generated in boilers, and low level process heat has been recovered by heating boiler feed water in economizers.

After oxidation the gas stream containing the sulfur trioxide passes through absorption towers in which the gaseous sulfur trioxide is absorbed into concentrated sulfuric acid, having a typical concentration of 98%. In a modern sulfuric acid plant there are typically two absorption towers, designated as the interpass absorption tower and the final absorption tower, which are respectively located in the process upstream from and downstream from the final catalyst stage in the converter. In the sulfuric acid plants of today, the gas stream is cooled prior to entry into the absorption towers to maximize the recovery of energy from the gas stream. The absorption tower is operated at a temperature which is selected to facilitate the absorption of sulfur trioxide into the sulfuric acid, to minimize the corrosion of piping and heat exchangers that occurs at higher temperatures, and to minimize the formation of acid mist. The absorption of sulfur trioxide into sulfuric acid is a highly exothermic reaction, and large amounts of heat are lost to cooling water while maintaining the low temperatures in the typical absorption towers.

The absorption tower is typically constructed such that the sulfuric acid flows downward through the tower and the enclosed packing material while the gas stream which contains the sulfur trioxide passes through the tower. The packing promotes contact between the sulfuric acid and the gas stream such that the sulfur trioxide is absorbed in the sulfuric acid. The acid drains into a pump tank, where water is added to dilute the acid to the desired strength. Both absorption and dilution are exothermic reactions, and the generated heat is removed in a heat exchanger which is typically located between the pump tank and the absorption tower inlet. The operation of the absorption tower is characterized by the concentration of the recirculated sulfuric acid, typically 98%, a low maximum acid exit temperature of approximately 120° C, and a typical acid inlet temperature of approximately 80° C. A lower acid inlet temperature would thermally shock the hot gas stream and often create an undesirable acid mist. A higher acid inlet temperature would increase the acid exit temperature and the corrosion of related piping and heat exchangers. It is thus known that the operating temperature of the absorption tower is set by and limited by considerations of the rate of corrosion of the equipment, and the undesirable formation of acid mist.

The absorption tower has typically been constructed as a brick lined carbon steel tower to limit corrosion. Typically, cast iron or ductile iron pipe has been used around the absorption tower. Historically, a number of materials have been used for acid coolers. These include cast iron pipe or radiator sections, alloy C276 plate type heat exchangers, polytetrafluorethylene (PTFE) tank coils and stainless steel shell and tube heat exchangers.

The cast iron coolers are limited in operating temperature to approximately 110° C by corrosion. They have poor heat transfer and occupy a large amount of space within the sulfuric acid plant. In addition, they have many mechanical joints which tend to leak and result in high maintenance requirements.

Alloy C276 plate type heat exchangers can be cost effective relative to the cast iron coolers. However, this expensive alloy is limited in use to a maximum acid temperature of approximately 90° C; thus, the liquid exiting from the absorption tower at approximately 120° C is mixed with cold recycle acid before entering the heat exchanger. This reduces the thermal driving force and shows that the use of expensive alloys will not provide an easy solution to the problem of heat recovery from sulfuric acid.

PTFE tank coils have been used to minimize corrosion. Small thin wall tubes, which are easily plugged, are required to obtain adequate heat transfer. The PTFE can withstand temperatures up to 200° C; however, in heat recovery applications its low mechanical strength limits the pressure of steam that can be generated. Thus, an intermediate heat transfer fluid is required for heat exchange with the hot sulfuric acid. A second heat exchanger is then required for heat exchange between the heat transfer fluid and steam; thus, this design is too expensive for use in this heat recovery application.

Stainless steel heat exchangers, typically type 316 stainless steel, have been used as acid coolers. These require careful control of the acid temperature and the acid velocity in order to minimize corrosion. The more recent anodically protected stainless steel acid coolers have proven to be a reliable means of minimizing corrosion; however, practice has been to limit acid operating temperatures to less than 115° C. The equipment to provide the anodic passivation is expensive.

Past practice with the aforementioned types of heat exchangers generally has been limited to rejecting the heat into cooling water or recovering heat in a low level form such as hot water for boiler feed or district heating.

Efforts have been made in the past to recover the heat generated when the sulfur trioxide is absorbed into sulfuric acid. U.S. Pat. No. 2,017,676 describes an apparatus for condensing sulfuric acid. Sulfur trioxide and sulfuric acid fumes are passed through a heat exchanger which has ceramic tubes to slowly and uniformly cool the gases from a temperature of about 350° C. to about 140° C. The ceramic tube material is used in contact with the sulfuric acid to prevent corrosion; however, a metallic tube is used concentrically about each ceramic tube to prevent mechanical stress and breakage of the ceramic tubes. The cooling medium, a high boiling point oil or boiling hot water, is allowed to become heated to high temperatures such as would be present in a steam boiler. When operated in this manner, the patent states that approximately 1.5 tons of steam may be generated per ton of sulfuric acid and the sulfuric acid manufacturing costs may be reduced.

British Pat. No. 1,175,055 describes a method for the manufacture of sulfuric acid in which the gases are alternately passed through a catalyst bed to convert sulfur dioxide to sulfur trioxide and a heat exchanger/condenser in which the gases are cooled in the presence of water vapor to condense a part of the sulfur trioxide as sulfuric acid. The heat exchangers are lined with, or constructed of, materials which are resistant to corrosion by the hot, concentrated sulfuric acid such as ceramic materials and porcelain, metals such as steel coated with polytetrafluoroethylene or other corrosion resistant materials, or metals such as silicon-iron and nickel alloys. The heat created by formation of sulfuric acid and the heat released by condensation is utilized to create high pressure steam which may be utilized as a source of power. The British Patent also discusses recovery of the sulfuric acid in a more concentrated form. By employing a stoichiometric deficiency of steam during the intermediate condensations, it is possible to obtain sulfuric acid having a concentration of greater than 100%. Only in the final condensation after completion of the conversion of sulfur dioxide to sulfur trioxide is the remaining sulfur trioxide condensed in the presence of a sufficient excess of steam to insure that substantially all of the sulfur trioxide is removed from the gas stream.

Both U.S. Pat. No. 2,017,676 and British Pat. No. 1,175,055 teach methods of recovering energy from the sulfuric acid process. However, both patents require the use of exotic materials of construction and emphasize the use of ceramics, porcelain materials, coated metals, brittle metals such as silicon-iron, and expensive nickel alloys for construction to prevent rapid corrosion and failure of the equipment.

Blumrich et al U.S. Pat. No. 4,330,364 describes a process for strengthening dilute phosphoric acid using energy derived from a contact sulfuric acid plant. In one embodiment, heat is transferred from an $H_2SO_4$ absorber acid stream to a phosphoric acid stream without the use of any intermediate fluid. In an alternative embodiment, a pressurized water system is interposed between the sulfuric acid and phosphoric acid systems. In the latter system the pressurized water is said to be heated to 120° C. by transfer of heat from 98.5% absorber acid which is cooled from 140° C. to 120° C. in the process. However, the reference contains no disclosure of the materials of construction to be used in the heat exchanger for transfer of heat from absorber acid to the pressurized water.

Sander and Beckmann, "Concentration of Dilute Sulfuric Acid and Phosphoric Acid With Waste Heat", paper 25 of "Making the Most of Sulfuric Acid", Proceedings of the British Sulphur Corporations's Fifth International Conference, Part II: Additional Papers and Discussions; London, November 16-18, 1981, includes a flow sheet for an integrated sulfuric acid plant with a venturi reconcentrator unit which uses waste heat from a double absorption production unit. In this process, hot acid from each of the intermediate and final absorbers is passed through a heat exchanger which transfers heat to spent acid to be concentrated in the Venturi reconcentrator. In the case of the intermediate absorber, absorber acid having a strength of 98.5% is passed through the heat exchanger where it is cooled from 130° to 110° C. by transfer of heat to the reconcentrator acid circulating stream. However, in the Sander system, the heat exchanger utilized contains Teflon rather than metal alloy tubes, and the recirculating acid is heated only to a temperature of 70°-80° C.

In connection with the concentration of phosphoric acid, the Sander et al reference refers to the possibility of running the sulfur trioxide absorption system as high as 130° to 140° C. to generate low pressure steam of 1.2 to 1.5 bar, and the use of such steam in a phosphoric acid vacuum concentrator. Sander et al further report an actual installation of a system apparently patterned on the process of the Blumrich et al patent. In the latter system, Sander et al state that the sulfuric acid is cooled from 110° C. to 90° C. in the course of heating demineralized water up to 90° C.

SUMMARY OF THE INVENTION

It is an object of this invention to provide a method for the recovery in high grade form of heat which is now lost to cooling water in the sulfuric acid process.

It is a further object of this invention to provide a method for recovery of the heat created in the sulfuric acid process when sulfur trioxide is absorbed into sulfuric acid.

It is yet another object of this invention to provide a method for the absorption of sulfur trioxide into hot, concentrated sulfuric acid while greatly reducing the corrosive effect of the sulfuric acid.

It is yet another object of this invention to provide a method for recovering the heat of absorption of sulfur trioxide in sulfuric acid at a higher temperature level, and thus in higher grade form, than has heretofore been practicable. A particular object is to recover absorption energy in the form of electricity, steam or process heat.

An additional object of this invention is to provide a heat recovery system consisting of a heat recovery tower, heat exchanger and associated equipment such as pumps and piping for use in a sulfuric acid plant which may be constructed of cost effective alloy materials rather than the porcelain, ceramic, and coated materials heretofore proposed for high temperature operation, all of which have mechanical, heat transfer and economic limitations.

These and other objects are obtained through a novel process in which the sulfur trioxide passing from the converter in a sulfuric acid plant is absorbed into hot concentrated sulfuric acid and the heat is recovered for useful purposes through heat exchange with a third fluid.

The process of the invention is implemented utilizing a novel apparatus for recovery of the energy of absorption of sulfur trioxide in sulfuric acid. This apparatus comprises a vessel containing an absorption zone in which sulfur trioxide is absorbed in a sulfuric acid stream, the absorption zone comprising means for promoting contact and mass transfer between a gas phase comprising sulfur trioxide and a liquid phase comprising sulfuric acid having a concentration of greater than 98% and less than 101% and a temperature of greater than 120° C. The apparatus further includes means for delivering sulfuric acid to the vessel for passage through the absorption zone, means for delivering gas comprising sulfur trioxide to the vessel for passage through the absorption zone, means for egress of sulfuric acid from the vessel after passage through the absorption zone, means for egress of the gas stream from the vessel after passage through the absorption zone, and a heat exchanger wherein the heat of absorption is recovered from the sulfuric acid in useful form by heat exchange with a third fluid. The heat exchanger comprises means for transfer of heat from sulfuric acid to the third fluid, the heat transfer means being fabricated of an alloy having a low corrosion rate when exposed to hot concentrated sulfuric acid.

More particularly, the invention is directed to such apparatus including a heat recovery tower having top and bottom inlets and top and bottom exits. The sulfur trioxide containing gas stream from the converter, after being cooled, enters the heat recovery tower through the bottom inlet and flows upward through the tower and the hot sulfuric acid stream enters the heat recovery tower through the top inlet and flows downward through the tower. At all points in the heat recovery tower and heat exchanger system the sulfuric acid has a concentration greater than 98% and less than 101% and a temperature greater than 120° C. The acid concentration is defined as being the weight percent of sulfuric acid. The counterflow of the gas stream and sulfuric acid maximizes the driving force for efficiently absorbing the sulfur trioxide into the sulfuric acid. Co-current flow of gas and acid can be utilized, but is less efficient. The absorption of sulfur trioxide into sulfuric acid is a process which is known to those having experience in the manufacture of sulfuric acid and will thus not be further described. This process will be referred to herein as the absorption of sulfur trioxide into sulfuric acid and the heat generated by the process will be referred to as the heat of absorption. The heat of absorption includes the heat liberated when water is added to dilute the recycled sulfuric acid, a process step which may occur within or external to the heat recovery tower. After the absorption of sulfur trioxide, the sulfuric acid stream passes through a heat exchanger wherein the heat of absorption is recovered through heat exchange with other fluids. It is desirable that the heat exchanger be fabricated from a metal to facilitate the transfer of heat from the sulfuric acid stream to other fluids. It has been discovered that by operating the heat recovery tower in a very narrow acid concentration range between 98% and 101%, and preferably between 98.5% and 100.0%, it is possible to absorb sulfur trioxide efficiently and to dramatically reduce the corrosion rate of certain alloys while operating at temperatures heretofore considered impracticable. It has been discovered that certain alloys exhibit excellent corrosion resistance in the concentration range previously defined, and at temperatures of 120° C. or higher. Stainless steel alloys are generally superior to high nickel alloys. Excellent corrosion resistance has been found for certain iron/chromium alloys, iron/chromium/nickel alloys and nickel/chromium alloys having austenitic, ferritic or duplex structures. Stainless steels of such structure have been found especially suitable. Thirty alloys were tested at service conditions typical of the heat recovery system. It has been determined that the corrosion resistance of these alloys can be characterized in terms of the percentages of major alloying constituents. The alloys best suited for service in this heat recovery system contained iron, chromium, and nickel as the principal alloy constituents, and had compositions which gave a corrosion index (CI) greater than 39

$$CI > 39$$

as defined by the following equation:

$$CI = 0.35(Fe+Mn) + 0.70(Cr) + 0.30(Ni) - 0.12(Mo)$$

where:
Fe = the weight percent of iron in the alloy,
Mn = the weight percent of manganese in the alloy,
Cr = the weight percent of chromium in the alloy,
Ni = the weight percent of nickel in the alloy, and
Mo = the weight percent of molybdenum in the alloy.

In a conventional sulfuric acid plant, the heat of absorption of sulfur trioxide into sulfuric acid is lost to cooling towers. By use of the process and apparatus of this invention, a high percentage of this previously lost energy may be recovered and profitably used. The heat may be used, for example, to produce low to medium pressure steam for process heating or to power a turbogenerator for the generation of electricity. In a 2700 tonne per day sulfur burning sulfuric acid plant approximately 6 megawatts of additional electrical power can be produced from the heat recovered in the heat recovery tower.

DESCRIPTION OF THE DRAWINGS

Corresponding reference characters indicate corresponding process equipment elements throughout the several views of the drawings.

DESCRIPTION OF THE PREFERRED EMBODIMENT

Figure 1:
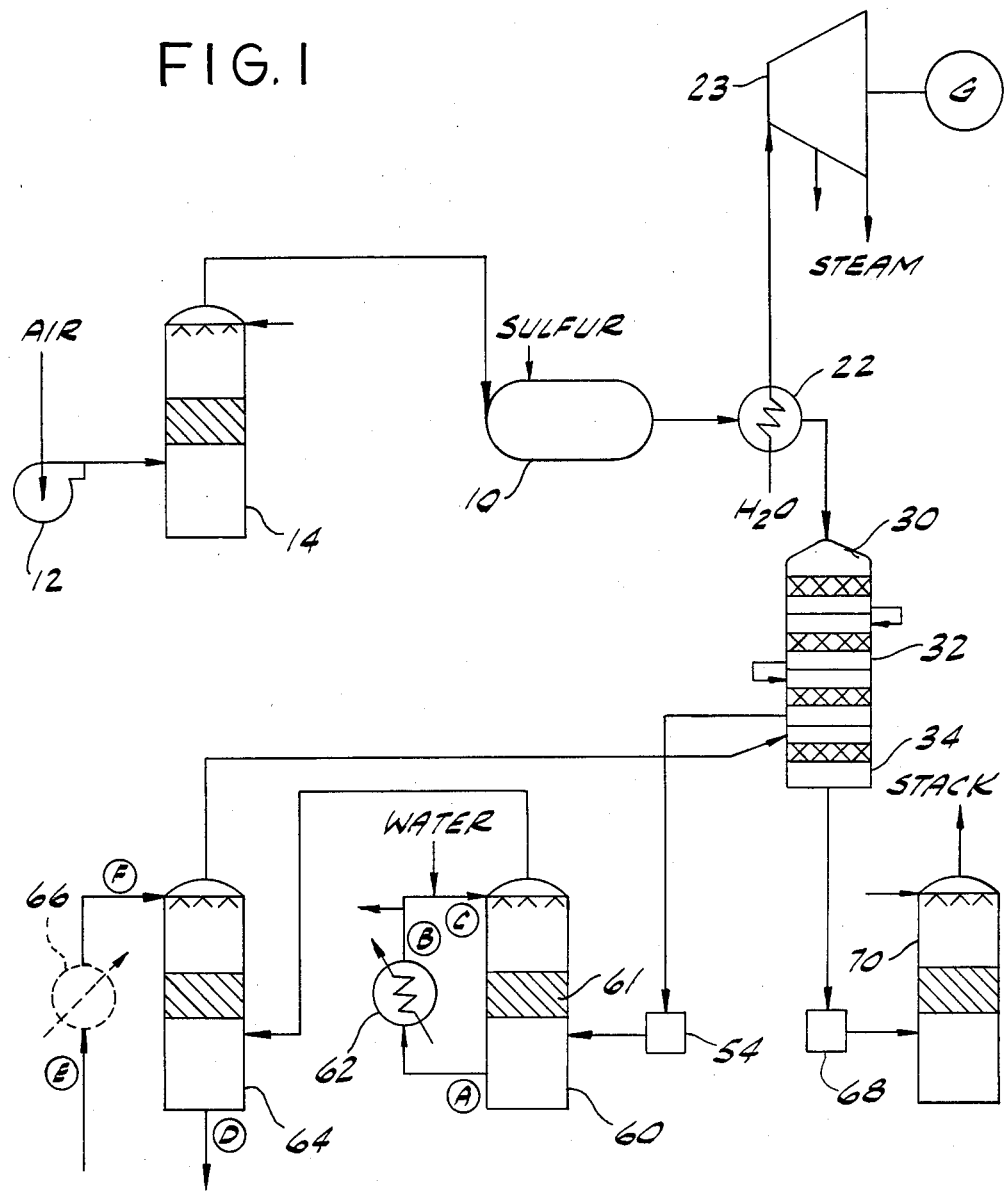
FIG. 1 is a process flow diagram of a sulfuric acid plant which includes the apparatus of this invention.

FIG. 1 illustrates a process flow diagram for a sulfuric acid plant which includes the apparatus of this invention. The sulfuric acid process is well known; thus, portions of the sulfuric acid plant will not be described in detail herein. The drawing shows a sulfuric acid plant which burns sulfur to supply the gas stream containing sulfur dioxide to the sulfuric acid plant.

Looking now at FIG. 1, blower 12 supplies air through drying tower 14 to the sulfur burner 10 in which the sulfur is burned, to provide a gas stream containing sulfur dioxide. The sulfur dioxide laden feed gas stream exits from the sulfur burner 10 and passes through a first heat exchanger 22, before entering the converter 30. The feed gas is cooled in first heat exchanger 22 to a temperature near the desired inlet temperature to the converter. First heat exchanger 22 is used to generate steam for driving a turbogenerator 23 for the generation of electrical power, but other uses are also practical.

Converter 30, a vessel for the catalytic conversion of sulfur dioxide into sulfur trioxide, typically has a plurality of catalyst beds which are divided into a first oxidation stage 32 and a second oxidation stage 34. Between any two catalyst beds there is heat exchange to remove the heat generated during the oxidation of the sulfur dioxide. These heat exchangers are not shown in FIG. 1. In a typical sulfuric acid plant, between the first oxidation stage 32 and the second oxidation stage 34 the gas stream passes through an interpass absorption tower to remove the sulfur trioxide from the gas stream to provide a gas stream to the second oxidation stage 34 that is lean in sulfur trioxide. As the sulfur dioxide laden feed gas stream passes through the first oxidation stage 32, greater than 90% of the sulfur dioxide will be converted to sulfur trioxide. The oxidation reaction is a reversible reaction which approaches an equilibrium; thus, some of the sulfur trioxide must be removed from the gas stream to enable the remaining sulfur dioxide to be oxidized easily. Economizer 54 is used to cool the gas stream exiting from the first oxidation stage 32 to a temperature which is above the dew point of the gas stream.

The sulfur trioxide in the gas stream is then absorbed into a sulfuric acid stream and heat is generated by the process. According to typical conventional practice, the absorption takes place in an absorption tower in which the acid temperature is maintained at a low level, to minimize corrosion of related piping and heat exchangers. However, the maintenance of the low temperature in the absorption tower makes it difficult to recover energy in an economically viable manner, that is, in a useful form.

In accordance with the embodiment of FIG. 1, a heat recovery tower 60 is provided downstream of the economizer 54. The cooled sulfur trioxide laden gas stream enters the lower portion of heat recovery tower 60 and flows upward through an absorption zone in the tower, the absorption zone containing means, such as a bed of packing 61, for promoting contact and mass transfer between the gas and liquid phases. While this description is of a packed tower, it is contemplated that other gas-liquid contacting devices such as tray towers or venturi absorbers can be used. Hot, liquid sulfuric acid is sprayed from the top of the heat recovery tower 60 onto the bed of packing 61 and, as the sulfuric acid and sulfur trioxide contact one another in the absorption zone, the sulfur trioxide is absorbed into the sulfuric acid. As delivered to the countercurrent absorption zone in the heat recovery tower 60, the sulfuric acid has a concentration greater than 98% and less than 101%, preferably between about 98.5% and about 99.3%, and a temperature greater than 120° C. As discussed above, the heat of absorption of the sulfur trioxide into the sulfuric acid is released in this process. Throughout the absorption zone, and throughout the course of $SO_3$ absorption therein, the strength of the sulfuric acid stream is maintained between 98% and 101%, preferably between 98.5% and 100.0%, and the acid temperature is maintained at greater than 120° C. After absorbing the sulfur trioxide and being heated by the exothermic reaction, the sulfuric acid exits the absorption zone and passes through the bottom outlet of the heat recovery tower. At the exit of the absorption zone and outlet at the tower, the acid has a concentration of greater than 98%, preferably greater than 99%, optimally between about 99.0% and about 100.0% and a temperature of greater than 120° C. After leaving the absorption zone, the hot concentrated sulfuric acid stream passes through heat exchanger 62 to remove the heat of absorption of the sulfur trioxide, prior to again being circulated through the heat recovery tower. Preferably heat exchanger 62 comprises a means for indirect transfer of heat between two fluids, ordinarily a solid partition such as, for example, the tube wall of a shell and tube heat exchanger, or the plates of a plate type exchanger. The absorption of the sulfur trioxide increases the concentration of the sulfuric acid; therefore, the sulfuric acid must be diluted at some point. The required water may be added within the heat recovery tower 60 or into the piping between the heat recovery tower 60 and the heat exchanger 62; however, it is preferred that the dilution water be added following cooling of the sulfuric acid in heat exchanger 62 at a point in which sufficient mixing may occur before the sulfuric acid enters the heat recovery tower 60. The dilution water can also be added as a vapor. This increases the amount of heat recovered and provides a means of upgrading atmospheric pressure steam to a useable higher pressure. Alternately, the dilution water can be added as dilute sulfuric acid.

In FIG. 1 the heat exchanger 62 is shown external from the heat recovery tower 60. While this is the preferred arrangement, it is recognized that the heat exchanger 62 may be located within the heat recovery tower 60. In heat exchanger 62 the heat of absorption released in the process is removed by heat transfer to a third fluid. Preferably, the cooling fluid is water and the heat of absorption is recovered by the generation of low to medium pressure steam, for example, steam having an absolute pressure between approximately 150 and 2000 kPa and normally between approximately 300 and 1200 kPa. Where liquid water is fed as the cooling fluid to the acid cooler, all or part of the water may be converted to steam. The steam produced by the heat recovery system is approximately 0.5 tonnes per tonne of acid produced when liquid water is used for acid dilution. This steam may be used within the manufacturing complex surrounding the sulfuric acid plant or to generate electricity. It is a common practice to remove low and/or medium pressure steam from a turbogenerator for process use. The removal of this steam reduces the electrical output of the turbogenerator. The steam generated in the heat exchanger 62 may be used to reduce the amount of steam normally removed from the turbogenerator or to eliminate this removal of steam altogether. If additional steam is available, it may be injected into the turbogenerator 23. The cessation of removal of steam from the turbogenerator increases its electrical output and the injection of additional steam will also increase the turbogenerator's electrical output. In a 2700 tonne per day sulfur burning sulfuric acid plant, approximately 6 megawatts of additional electrical power can be produced as a result of the use of the steam generated in the heat exchanger 62. Alternatively, electrical power can be generated by using heat exchanger 62 as the boiler for vaporizing an organic liquid for use in driving a generator or otherwise producing work in an organic Rankine cycle. The higher temperatures available through the use of the heat recovery tower have now made such usage economically feasible.

In this way the heat of absorption of sulfur trioxide into sulfuric acid may be removed from the sulfuric acid process in a useful form; that is, in a form which may be utilized to produce a benefit either through use in a process or through the generation of electricity. This is in contrast to the current typical loss of this heat through removal by cooling water and release of the heat to the atmosphere in cooling towers.

Implementation of the improvements illustrated in FIG. 1 provides a major increase in the overall recovery of energy from a contact sulfuric acid manufacturing plant. Prior to the present invention, developments such as increased converter reaction gas strength, low temperature economizers, reduced gas stream pressure drop, heating of boiler feed water with low temperature effluent heat, and use of suction drying towers had improved to about 70% the recovery of energy in high grade form, as electricity, steam or otherwise as a source of process heat. Introduction of the improved process of the invention increases that high grade energy recovery efficiency to 90–95%.

Following passage of the gas stream through the heat recovery tower, the gas stream exits from the top of the heat recovery tower 60 and passes to the absorption zone of an interpass absorption tower 64 where absorption of any sulfur trioxide remaining in the gas stream takes place. Although shown as comprising a separate tower in FIG. 1, the interpass absorber may comprise a separate stage positioned within the same housing as the heat recovery zone. In a typical sulfuric acid plant in which all of the sulfur trioxide is absorbed into a sulfuric acid stream in the interpass absorption tower 64, it is necessary to remove the heat of absorption. Thus, an acid cooler 66 is provided for the sulfuric acid recirculating through the interpass absorption tower 64. However, in a sulfuric acid plant utilizing the current invention, most of the sulfur trioxide is absorbed into sulfuric acid in the heat recovery tower 60; thus, only a small portion of the sulfur trioxide remains to be absorbed in the interpass absorption tower 64. Only a small temperature rise occurs within the interpass absorption tower 64. In the circumstances this small heat load may be removed elsewhere in the system; thus, the acid cooler 66 is usually unnecessary and may be eliminated. The dotted lines used to show the acid cooler 66 in FIG. 1 indicate that the acid cooler 66 has been removed from the process.

As a result of the high temperature operation of the heat recovery tower, the gas stream exiting the heat recovery tower is relatively hot, and is in contact with hot acid. This in turn results in stripping of sulfuric acid from the acid stream into the gas stream. On passage through interpass absorption tower 64, the gas stream is cooled, typically to a temperature in the range of between about 75° C. and about 120° C., preferably between about 75° C. and about 100° C., by contact with the acid stream circulating through the interpass tower. At the gas exit from the interpass tower absorption zone, it is preferred that the acid temperature be below about 120° C., preferably below about 100° C., and at least about 10° C. lower than the temperature of the acid at the inlet of the heat recovery tower. In a countercurrent interpass tower, the acid preferably enters at a temperature of about 75° to about 100° C. Where an interpass tower is used, it is preferred that the acid temperature throughout the interpass tower be lower than the acid temperature at the inlet of the heat recovery tower.

As the gas stream cools during its passage through the interpass tower, sulfuric acid vapor condenses and is either absorbed by the interpass tower acid stream or collected by a mist eliminator positioned in or at the exit of the interpass tower. Such lowering of the dew point of the gas stream helps minimize condensation of acid and corrosion of downstream ducts and equipment.

Where there is no separate interpass tower, the interstage absorption may be accomplished essentially in a single absorption zone within heat recovery tower 60. In this instance, the gas leaving the tower is preferably cooled before return to the converter, for example, by passing it through an economizer for heating boiler feed water. In this case, the dew point of the gas stream is also preferably reduced to 75° C. to 120° C. by cooling it to a temperature in that range. However, in the latter instance, condensation of sulfuric acid in the economizer creates conditions which are corrosive to many metals. Thus, an economizer used to lower the dew point should be constructed of a metal of the type discussed above for use in the heat recovery tower acid cooler. It is also important to control the addition of dilution water to the heat recovery tower recirculating stream so that the acid condensed in the economizer has a strength of at least 98.5%.

Alternatively, the dew point may be lowered by passage of the gas stream through a direct contact cooler, such as a packed tower, countercurrent to sulfuric acid flowing at a relatively low flow rate, i.e., so that the temperature of the acid leaving the contact cooler approaches the temperature of the acid at the inlet of the heat recovery tower. Thus, contact with the acid is effective in reducing the dew point of the gas (and absorbing residual sulfur trioxide), but the acid is heated to a temperature high enough so that it may be blended into the acid entering the heat recovery absorption zone without significantly reducing the temperature at which energy is recovered from the heat recovery system. The relatively small temperature difference between gas and liquid throughout the cooling zone minimizes acid mist formation. Such a packed tower cooler may be constructed either as a separate vessel or as a separate stage within the same housing that contains the heat recovery absorption zone. In either instance, it is preferred that the temperature of the cooling acid that is in contact with the gas leaving the cooling zone be at least 10° C. lower than the acid temperature at the inlet of the heat recovery absorption zone. Whatever approach is taken, lowering of the gas dew point is important for protecting carbon steel heat exchangers conventionally located downstream of the converter to which the gas stream is returned.

The remainder of the sulfuric acid process shown in FIG. 1 is well known. The sulfur trioxide depleted gas stream is returned to the second oxidation stage 34 of the converter 30 to complete oxidation of the remaining sulfur dioxide. This final passage through an oxidation stage will complete the conversion of sulfur dioxide to sulfur trioxide. The gas stream exits from the converter 30, passes through an economizer 68 for cooling, and passes through the final absorption tower 70 in which the sulfur trioxide in the gas stream is absorbed into sulfuric acid. The amount of sulfur trioxide present to be absorbed is much smaller than that which is absorbed in the heat recovery tower and interpass absorption tower; thus, only a small amount of heat is created by the absorption of the sulfur trioxide into sulfuric acid in the final absorption tower 70. Following absorption of the sulfur trioxide, the gas stream is released to the atmosphere.

While the above description is for an interpass plant, it is contemplated that the heat recovery tower can be installed upstream of the absorption tower in a non-interpass plant. For some operating conditions, as noted above, it is also contemplated that the heat recovery tower can replace the interpass absorption tower in an interpass plant, or the absorbing tower in a non-interpass plant. As further noted above, this is not the preferred mode of operation for a heat recovery tower located between converter stages, unless the heat recovery tower includes a cooling zone to reduce the high sulfuric acid vapor content of the gas exiting a heat recovery tower, which would otherwise lead to corrosion of downstream equipment. Without a cooling zone, it is not preferred in the case of final absorption either, since residual sulfur trioxide and sulfuric acid vapor contained in the exit gas from the heat recovery tower constitute undesirable atmospheric emissions if not recovered in a lower temperature final absorption tower or in other emission control apparatus. Moreover, in the case of either an interpass or final absorption system, problems of corrosion and/or emissions would be aggravated by any upsets in the operation of the heat recovery tower.

Figure 2:
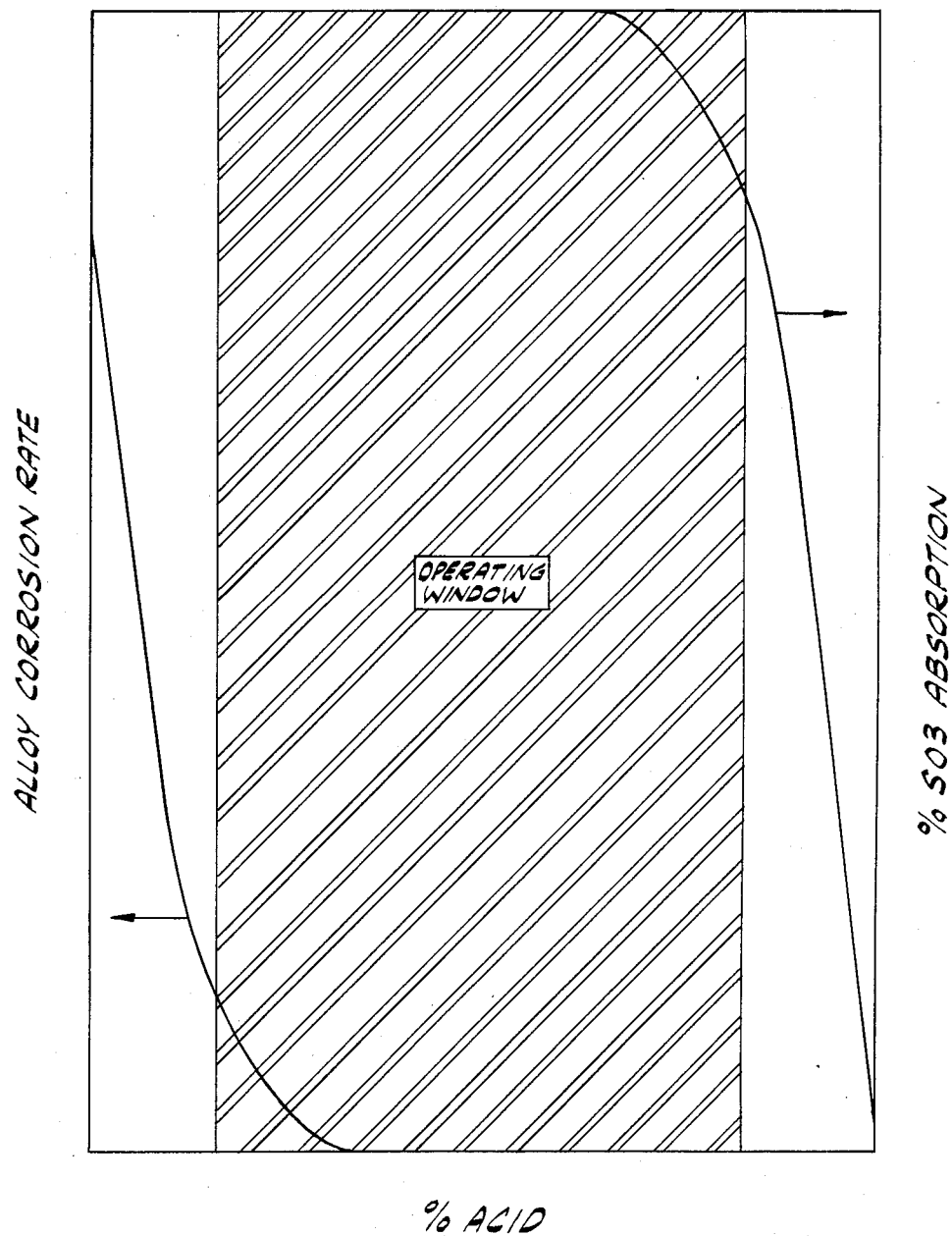
FIG. 2 is a schematic which illustrates the corrosion rate of alloys and the degree of absorption of sulfur trioxide into sulfuric acid at a given temperature as the concentration of the sulfuric acid varies.

Referring to FIG. 2, it can be seen that at constant temperature, both the corrosion rate of certain alloys and the degree of sulfur trioxide absorption decrease rapidly as the sulfuric acid concentration increases. It has been determined for this invention that there is a narrow window of operation in which the corrosiveness of the sulfuric acid to certain alloys at high temperature is greatly reduced while the absorption of sulfur trioxide into sulfuric acid is maintained at a sufficient level to remove the sulfur trioxide from the gas stream passing through the heat recovery tower.

Figure 3:
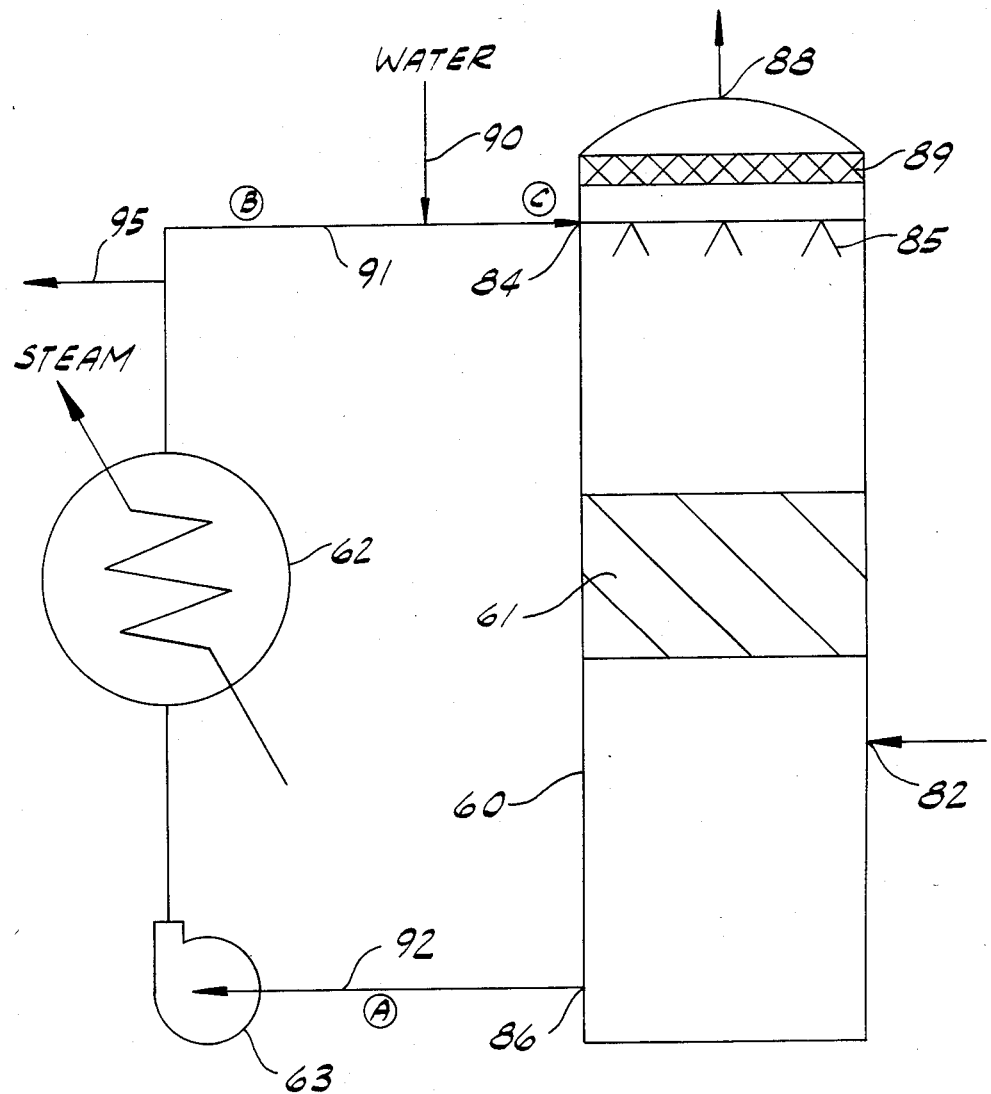
FIG. 3 is a diagram of the process and apparatus of this invention.

Referring now to FIG. 3, the heat recovery tower 60 of this invention and its associated piping, including the heat exchanger 62 and pump 63 are shown. The sulfur trioxide laden gas stream, leaving the first oxidation stage 32 of converter 30, enters the heat recovery tower 60 through bottom inlet 82. The gas stream passes upward through the absorption zone comprising the bed of packing 61 in which the gas contacts the sulfuric acid stream and the sulfur trioxide is absorbed into the sulfuric acid. The sulfur trioxide depleted gas stream exits from the heat recovery tower 60 through mist eliminator 89 and top outlet 88. The sulfuric acid enters the heat recovery tower 60 through top inlet 84 and is sprayed through a plurality of acid distributors 85 onto the upper surface of the bed of packing 61. The sulfuric acid flows downward through the bed of packing 61 in which it comes in contact with the rising sulfur trioxide laden gas stream and the sulfur trioxide is absorbed into the sulfuric acid. The absorption of the sulfur trioxide into the sulfuric acid is an exothermic process. The hot sulfuric acid enters the heat recovery tower 60 at a temperature greater than 120° C. and, after absorbing the sulfur trioxide and being heated by the exothermic reaction, the sulfuric acid exits from the heat recovery tower 60 at a temperature as high as about 250° C. The sulfuric acid exits from the heat recovery tower through bottom outlet 86 and is pumped by pump 63 through heat exchanger 62 to remove, by transfer to a third fluid, the heat generated by the absorption of the sulfur trioxide prior to again being circulated through tower 60. Preferably, the acid stream has a concentration of greater than 98% and less than 101% and a temperature of greater than 120° C., more preferably greater than 125° C. throughout the course of heat transfer to the another fluid. It is also preferred that the third fluid be heated to a temperature of at least 120° C., more preferably greater than 125° C., in its passage through exchanger 62. Corrosion of the heat exchanger is minimized if the acid concentration is at least 99% throughout the course of heat transfer. Following passage through heat exchanger 62, a portion of the sulfuric acid is removed as product through the acid pipe 95. In addition to the rise in the temperature of the sulfuric acid, the absorption of the sulfur trioxide increases the concentration of the sulfuric acid; therefore, the sulfuric acid must be diluted. The sulfuric acid may be diluted by the addition of dilute sulfuric acid or water in the liquid or vapor state; and the terms water or dilution water will be used to refer to the diluent. The required water for dilution of the acid is shown being added in line through pipe 90 upstream of the absorption zone. It is preferred that the dilution water be added, as shown, in the piping 91 between the heat exchanger 62 and the entry of the sulfuric acid into the heat recovery tower 60 through top inlet 84. However, the addition of the dilution water at this point is not required for this invention. The dilution water may be added prior to passage of the sulfuric acid through the heat exchanger 62 or may be added to the sulfuric acid within the heat recovery tower 60, either upstream, downstream or within the absorption zone comprising packing 61. The preferred location for the addition of dilution water, represented by pipe 90, allows the alloy pump and heat exchanger to operate at the highest sulfuric acid concentration, which gives the lowest rate of corrosion, at any given temperature within the operating range. It is particularly preferred that the acid strength be maintained above 99% throughout the alloy heat exchanger. Acid strength downstream of the dilution point is monitored by a conductivity probe. Conveniently, the rate of dilution water addition is controlled by throttling a feed control valve in response to a feedback controller that in turn operates in response to the conductivity probe downstream of the addition point.

For the purposes of this invention it has been determined that the preferred operating conditions for the heat recovery tower comprise sulfuric acid temperatures greater than 120° C. and concentrations greater than 98% and less than 101%, more preferably 98.5% to 100.0%. Operation of the heat recovery tower under these conditions provides the reduced sulfuric acid corrosiveness to certain alloys necessary for operation of the equipment for long periods of time, and a high degree of absorption of sulfur trioxide into the sulfuric acid. A reduced level of sulfur trioxide absorption would reduce the amount of energy recovered in useful form. To provide good absorption efficiency, the temperature of the acid at the outlet of the tower, and at the inlet of the acid cooler, is preferably not greater than about 250° C. Within that limit, however, the acid temperature may be varied rather widely, depending on the manner in which the absorption heat is ultimately to be utilized. Thus, for example, the energy may be used to generate low pressure steam for concentration of phosphoric acid in an integrated sulfuric acid/phosphoric acid plant, in which case the temperature of the acid should be above 120° C. through the heat exchanger, and consequently somewhat higher than that at both the inlet and exit of the heat recovery tower. To provide a working margin to compensate for line pressure drop, phosphoric acid evaporator steam chest fouling, and the like, it is preferred that the acid temperature throughout the heat exchanger be above 130° C., more preferably above 140° C., and most preferably above 150° C. Temperatures significantly above 150° C. are generally unnecessary in an integrated sulfuric acid/phosphoric acid plant.

However, it has been found that the process of the invention is capable of operating with substantially higher acid temperatures, both at the inlet and exit of the tower and throughout the heat exchanger. Operation at such higher temperatures makes possible the generation of medium pressure steam for such applications as the operation of a turbogenerator for the production of electricity. In such instance, it is preferred that the acid temperature throughout the heat exchanger be above 150° C., more preferably above 175° C., and even more preferably above 200° C. To provide such temperatures throughout the heat exchanger, it is, of course, necessary to maintain even higher temperatures at both the exit and inlet of the heat recovery tower. For certain alloys, it has been found that at some temperature above 120° C. the rate of corrosion in 98-101% acid actually begins to decrease with temperature, particularly at concentrations above 99%. For such alloys, an especially attractive mode of operation may be to maintain an acid temperature entering the heat exchanger at somewhat above the point where the negative relationship between temperature and corrosion rate begins to obtain.

The upper acid concentration limit of 101% is established on the basis of achieving a high degree of absorption in the heat recovery tower while operating at conventional acid plant pressures which are near atmospheric. The upper acid concentration limit can be extended to approximately 105% if the heat recovery tower is operated at a pressure up to 1000 kPa. Where the tower is operated under pressures up to 1000 kPa, the preferred acid temperature range in the tower is between about 150° C. and about 270° C.

It has been determined that certain materials are particularly suitable for construction of the heat recovery tower 60, the heat exchanger 62, the pump 63 and the other equipment associated with them. In particular certain alloys have been found to be preferable for their corrosion resistance at the conditions under which the heat recovery tower, heat exchanger and pump will be operated. Similarly, such alloys can be utilized as materials of construction for other equipment or components exposed to sulfuric acid at the abovedescribed concentrations and temperatures, for example, in piping, ductwork, heat exchangers or other equipment located downstream of the heat recovery tower. These alloys exhibit minimal, industrially acceptable, corrosion at acid concentrations of 98-101% and temperatures above 120° C. It has been determined that the corrosion resistance of these alloys can be characterized in terms of the percentages of the major alloying constituents. Provided that the acid concentration is maintained within the ranges specified hereinabove, it has been determined that the rates of corrosion are surprisingly low for a substantial range of iron/chromium, nickel/chromium, and iron/chromium/nickel alloys, even at highly elevated temperatures substantially above 120° C. As indicated above, the alloys used for heat exchanger tubes, and other equipment elements exposed to the hot concentrated heat recovery tower absorber acid, should be constituted of either a ferrous alloy containing chromium, an iron-nickel alloy containing chromium, or a nickel alloy containing chromium. In each instance, the alloy should have an austenitic, ferritic, or duplex structure.

Generally suitable stainless steel (ferrous) and iron-nickel alloys may contain between about 16% and about 30% by weight chromium, up to about 33% by weight nickel, up to about 6%, preferably up to about 4%, by weight molybdenum, and between about 35% and about 83%, preferably about 46% to about 83%, by weight iron. Other alloying elements such as copper, manganese, silicon, cobalt, tungsten, niobium, titanium, nitrogen, sulfur, phosphorus, and carbon may also be present in minor proportions.

Nickel base alloys useful in the method of the invention may generally contain between about 32% and about 76% preferably about 37% to about 43%, by weight nickel, between about 1% and about 31%, preferably about 23% to about 31%, by weight chromium, between about 2% and about 46%, preferably between about 16% and about 28%, by weight iron, and up to about 28%, preferably up to about 3%, by weight molybdenum. As in the case of stainless steel type and iron/chromium/nickel type alloys, the nickel base alloys may also contain minor proportions of other alloying elements.

The alloys best suited for service in this heat recovery system have compositions which give a corrosion index (CI) greater than 39, $$CI > 39$$

as defined by the following equation:

$$CI = 0.35(Fe + Mn) + 0.70(Cr) + 0.30(Ni) - 0.12(Mo)$$

where:
Fe = the weight percent of iron in the alloy,
Mn = the weight percent of manganese in the alloy,
Cr = the weight percent of chromium in the alloy,
Ni = the weight percent of nickel in the alloy, and
Mo = the weight percent of molybdenum in the alloy.

For alloys of the above-described type, industrially acceptable corrosion rates are a matter of economics. In addition to varying with general economic factors bearing on the profitability of a given plant, the acceptable rate of corrosion varies with the function of the particular piece of equipment for which an alloy is considered as a candidate. For heat exchanger tubes, however, it may be said that an acceptable rate is generally in the range of 0.05 to 0.08 mm/yr. For piping, pump tanks, distributors, or the shell of an absorption tower, slightly to moderately higher rates of corrosion may be tolerated. Based on corrosion data obtained in connection with the development of the process of the invention, it has been found that stainless steel type alloys are generally preferred to nickel alloys for use in equipment exposed to the heat recovery tower absorber acid at temperatures above 120° C.

A preferred material of construction is 304L stainless steel which typically contains about 18-20% by weight chromium, about 8-12% by weight nickel, up to about 2% by weight manganese, up to about 1.0% by weight silicon, up to about 0.030% by weight carbon, up to about 0.045% phosphorus, and up to about 0.030% sulfur and the balance essentially iron. Another preferred material is 309 stainless steel which comprises approximately 20-24% by weight chromium, about 12-15% by weight nickel, up to about 1.0% by weight silicon, up to about 0.045% phosphorus, up to about 0.03% sulfur and the balance essentially iron. Especially preferred is 310 stainless steel which contains between about 24% and about 26% by weight chromium, between about 19% and about 22% by weight nickel, up to about 2.0% manganese, up to about 1.5% by weight silicon, up to about 0.08% by weight carbon, up to about 0.045% phosphorus, up to about 0.030% sulfur, and the balance essentially iron. Other particularly useful alloys include E-Brite Alloy 26-1, which comprises between about 25.0% and about 27.5% by weight chromium, between about 0.75% and about 1.50% by weight molybdenum, between about 0.05% and about 0.20% by weight niobium, up to about 0.50% by weight nickel, up to about 0.20% by weight copper, up to about 0.40% by weight manganese, up to about 0.02% by weight phosphorus, up to about 0.02% by weight sulfur, up to about 0.40% by weight silicon, up to about 0.01% by weight carbon, up to about 0.015% by weight nitrogen, and the balance essentially iron; and Ferralium Alloy 255, which comprises between about 24.0% and about 27.0% by weight chromium, between about 2.0% and about 4.0% by weight molybdenum, between about 4.5% and about 6.5% by weight nickel, between about 1.5% and about 2.5% by weight copper, between about 0.10% and about 0.25% by weight nitrogen, up to about 1.0% by weight silicon, up to about 1.5% by weight manganese, up to about 0.04% by weight carbon, up to about 0.04% by weight phosphorus, up to about 0.03% by weight sulfur, and the balance essentially iron. As generally exemplified by Alloy 26-1, Alloy 255, 304L stainless steel, 309 stainless steel and 310 stainless steel, a preferred range of alloys comprises between about 16% and about 30% by weight chromium, up to about 23% by weight nickel, up to about 4% by weight molybdenum, and the balance essentially iron. Other conventional alloying elements may be present in minor proportions.

While these alloys of the above-described type are preferred for construction, sometimes conventional materials of construction for the heat recovery tower will be more cost effective. At these times the heat recovery tower can be constructed of carbon steel and lined with a ceramic material to protect the carbon steel shell from the corrosive attack of the sulfuric acid. Such construction is very similar to that typically utilized for the interpass absorption tower. In the case of heat exchanger 62, either the entire exchanger or only the means for transfer of heat from the acid to the third fluid, for example, the tubes, tube sheet, and channels of a shell and tube exchanger, are fabricated of the corrosion resistant alloy. In the latter case, the acid is passed through the tubes of the exchanger and the shell is constructed of a relatively low cost material such as mild steel for containment of a relatively non-corrosive cooling fluid.

The function of the heat recovery tower is to contain the sulfuric acid and the sulfur trioxide laden gas stream and to provide for the contacting of these two streams such that the sulfur trioxide is absorbed into the sulfuric acid. As the absorption of the sulfur trioxide into the sulfuric acid is an exothermic reaction, the acid is heated. It is preferred that the sulfuric acid entering the heat recovery tower have a temperature greater than 120° C. The heat of absorption will raise this temperature, generally within the range of 10°-60° C., more typically by 20°-40° C. The exit temperature from the tower may be as high as about 250° C. While this is the preferred operating range for the acid temperature, it is possible to operate at higher temperatures by increasing the pressure or reducing the degree of sulfur trioxide absorption. In the preferred temperature range low to medium pressure steam, for example, steam having a pressure between approximately 150 and 2000 kPa, preferably 300-1200 kPa, may be generated. Increasing the steam pressure will require a corresponding increase in the temperature of the sulfuric acid entering the heat recovery tower.

Steam generated by transfer of the absorption heat may be used in a variety of applications. Relatively low pressure steam at a temperature greater than 120° C., more preferably at a temperature greater than about 125° C., is advantageously used as a source of energy for concentrating phosphoric acid in an integrated sulfuric/phosphoric acid plant. As noted above, it may be advantageous to generate steam at somewhat higher temperatures to compensate for such problems as line pressure drop between the heat exchanger for cooling sulfuric acid and the phosphoric acid evaporator, and fouling of the tubes of the phosphoric acid evaporator steam chest. Thus, for such applications, it is preferred that the third fluid be heated to a temperature of at least about 130° C., more preferably at least about 140° C., and most preferably at least about 150° C.

Alternatively, steam may be generated at higher temperature and pressure for use in operating a turbogenerator or for delivering process heat at temperatures higher than that required, for example, in concentrating phosphoric acid. For such higher temperature applications, it is preferred that the other fluid to which the absorption heat is transferred, whether steam or some other fluid, be heated in the sulfuric acid heat exchanger to a temperature of at least about 150° C., more preferably at least about 175° C., most preferably to at least about 200° C. It will be understood that the inlet temperature to the sulfuric acid heat exchanger will exceed the temperature to which the third fluid is heated by an increment of roughly 20°-70° C., more typically 30°-50° C.

In a particularly preferred mode of operation, the tower is operated at essentially atmospheric pressure, the acid leaving the tower 60 is maintained at a temperature greater than 150° C., and steam is generated in heat exchanger 62 at a pressure of 440 kPa absolute or greater.

Again, it must be stated that this invention is not limited to the configuration shown in FIG. 3. The heat exchanger 62 is shown located externally of the heat recovery tower 60. This is for numerous reasons the preferred embodiment; however, the heat exchanger may also be located within the heat recovery tower 60. Similarly, the dilution water is shown being added through pipe 90 into pipe 91 between the heat exchanger 62 and the top inlet 84 to the heat recovery tower 60. With this preferred configuration the heat exchanger 62 and pump 63 always contact acid of the highest concentration which provides the lowest corrosion rates and the highest degree of protection to the heat exchanger and pump. It is also contemplated, and is a part of this invention, that the dilution water may be added into pipe 92 which is located between the bottom outlet 86 of heat recovery tower 60 and the heat exchanger 62. It is also contemplated that the dilution water could be added directly to the heat recovery tower 60 or to the gas stream entering the tower. It is noted that the addition of dilution water downstream of the absorption zone, or in the zone near the acid exit point, will reduce the sulfuric acid concentration before it passes through the pump 63 and heat exchanger 62 and that this lower sulfuric acid concentration will result in a higher corrosion rate for the heat exchanger 62 and pump 63.

Figure 5:
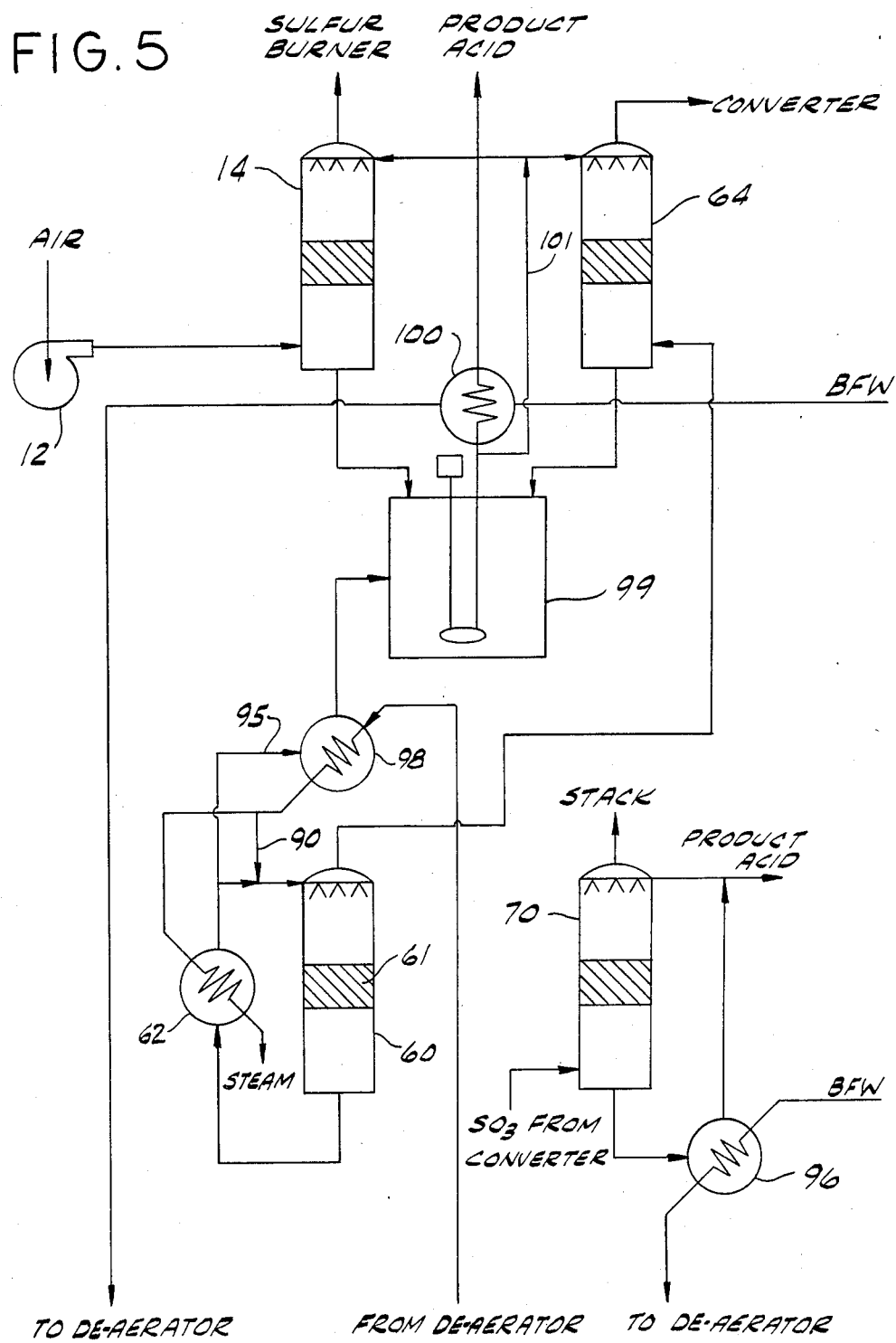
FIG. 5 is a process flow diagram illustrating a preferred scheme for implementing the improved process of the invention.

Illustrated in FIG. 5 is a particularly preferred embodiment of the process of the invention. In this system, boiler feed water is preheated in a heat exchanger 96 by transfer of heat from final absorption tower circulating acid, and in a heat exchanger 100 by transfer of heat from acid circulating through drying tower 14 and interpass absorption tower 64. Preheated boiler feed water is sent to a de-aerator (not shown), and a portion of the water exiting the de-aerator is returned to another heat exchanger 98 where it is further heated by transfer of heat from the product acid stream that is withdrawn from the heat recovery tower circulating loop via discharge line 95. A major portion of the boiler feed water stream leaving exchanger 98 is delivered to heat exchanger 62 where it is vaporized to produce steam that may be used for power generation or process heat. However, a side stream of the water leaving exchanger 98 is diverted to line 90 through which it is injected as makeup water into the heat recovery tower circulating loop. Depending on the volume of feed water and the particular conditions prevailing in the final absorption tower, the boiler feed water may be partially vaporized by the time it reaches pipe 90.

A circulating acid pump tank 99 is provided for drying tower 14 and interpass absorption tower 64. Product acid from exchanger 98 is delivered to tank 99. Some or all of the acid returned to tower 64 may bypass exchanger 100 through line 101, thereby increasing the temperature of the acid in the pump tank and allowing the boiler feed water passing through the exchanger to be heated to a higher temperature than would otherwise be feasible. A product acid stream is removed from tank 99 through boiler feed water preheater 100.

Figure 4:
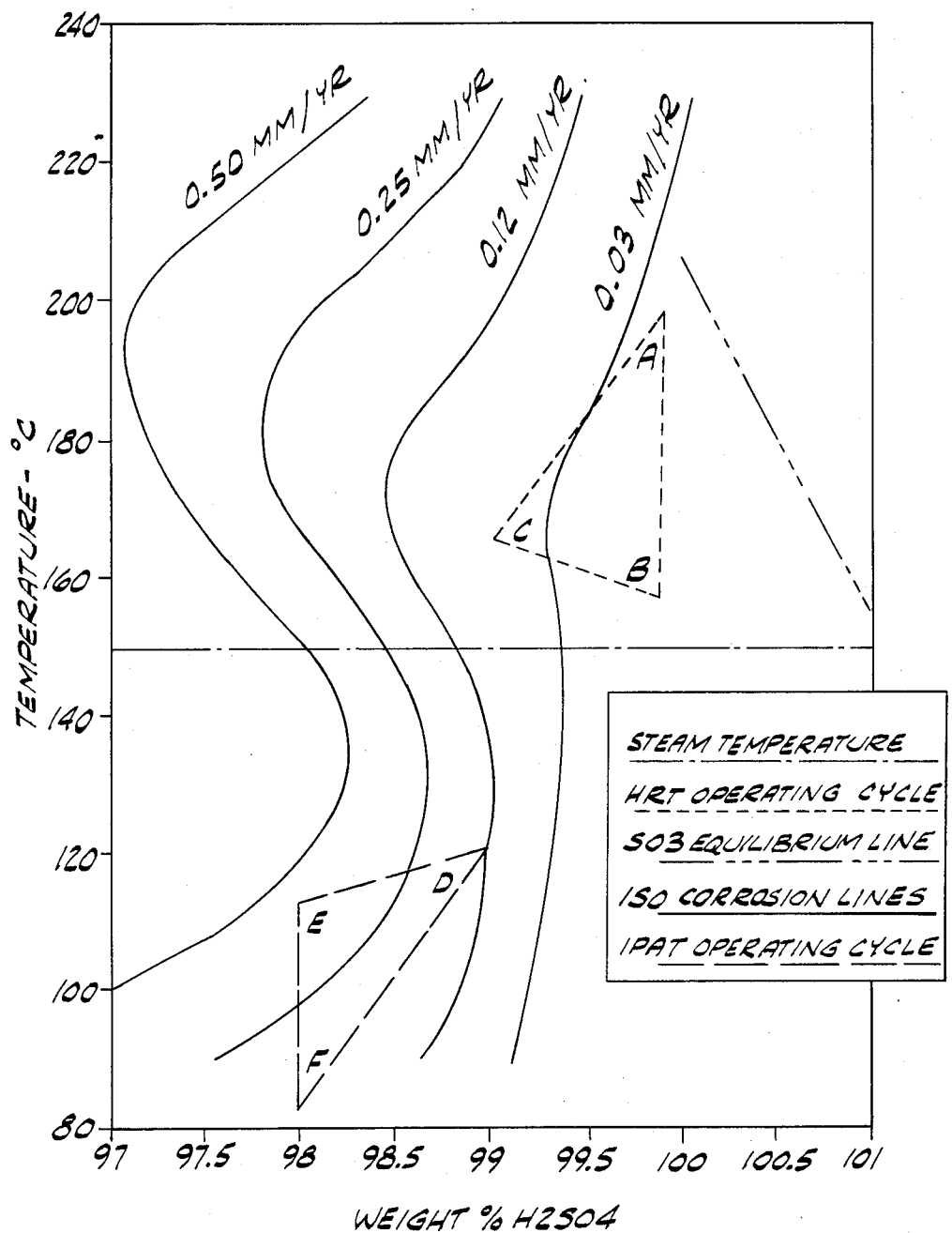
FIG. 4 is a graph showing the operating cycle of the heat recovery tower in relation to the operating cycle of a typical interpass absorption tower.

FIG. 4 is a graph which shows the operating cycle of the heat recovery tower 60 in terms of the temperature and concentration of the sulfuric acid. Shown on the graph are isocorrosion lines for type 304L stainless steel. Also shown is a line representing the sulfur trioxide equilibrium between typical inlet gas and outlet acid. This equilibrium line defines the limiting conditions for the absorption of sulfur trioxide in the acid at atmospheric pressure. The operating cycle of the heat recovery tower is shown as a triangle ABC. The location of points A, B and C in the process may be found in FIG. 3 and FIG. 1. Point A of the operating cycle represents the conditions, the temperature and concentration of the sulfuric acid, at the bottom outlet 86 from the heat recovery tower 60. Point B represents the sulfuric acid conditions after passage through the heat exchanger 62. Point C represents the sulfuric acid conditions as the sulfuric acid is entering the heat recovery tower through top inlet 84, after the addition of the dilution water.

Looking at FIGS. 3 and 4, it is of interest to discuss a complete operating cycle by considering the flow of the sulfuric acid starting at point C. The sulfuric acid enters the heat recovery tower 60 at a temperature of approximately 165° C. and a concentration of approximately 99%. As the sulfuric acid passes downward through the heat recovery tower and absorbs the sulfur trioxide from the gas stream passing upward through the heat recovery tower an exothermic reaction takes place. The temperature of the sulfuric acid rises and the concentration increases. At the outlet of the heat recovery tower, represented by point A, the sulfuric acid has a temperature of approximately 200° C. and a concentration of approximately 100%. Following the heat recovery tower, the sulfuric acid flows through heat exchanger 62 and is cooled. Reference point B is at the exit of the heat exchanger 62. At this point the acid has been cooled from approximately 200° C. to approximately 157° C. and the acid concentration has remained constant. Before the sulfuric acid enters the heat recovery tower again, dilution water is added. The addition of water to the concentrated sulfuric acid reduces the concentration and causes a rise in temperature. Therefore, the triangle of the operating cycle shows that the concentration of the sulfuric acid is reduced from approximately 100% to approximately 99% and that, during this reduction, the temperature of the sulfuric acid rises from approximately 157° C. to 165° C. At this point the sulfuric acid again enters the heat recovery tower and the operating cycle is repeated.

It is easy to see in FIG. 4 the relationship between the operating cycle of the heat recovery tower 60, which includes the heat exchanger 62, the corrosion rates for type 304L stainless steel at different temperatures and sulfuric acid strengths, the equilibrium line for the absorption of sulfur trioxide into the sulfuric acid, and the temperature of the steam that may be generated. This operating cycle is compared to the operating cycle of a typical interpass absorption tower represented by the triangle DEF. The location of points D, E, and F in the process may be found in FIG. 1. Point D represents the conditions of temperature and acid concentration leaving the interpass tower. Point E represents a typical condition where the acid in the pump tank has been diluted with water and cooled by mixing with colder acid draining from the drying tower circuit. Point F represents the temperature and acid concentration leaving the acid cooler and recirculating to the interpass absorbing tower. It can be seen in FIG. 4 that the heat recovery tower of this invention permits absorbing sulfur trioxide at significantly higher temperature than previously practiced, while reducing corrosion rates for type 304L stainless steel by a factor of ten or more, compared to that obtained at acid temperatures and concentrations characteristic of past practices. Significant reductions in corrosion rates were found for the other alloys which have a corrosion index (CI) greater than 39, with the extent of the reduction dependent upon the specific alloy.

It may be noted that the discoveries of the present invention with respect to materials of construction have general application to the storage, transportation or handling of hot concentrated sulfuric acid streams irrespective of the particular process or other operation that may be involved. Thus, a basic method has been discovered for storing, transporting or handling sulfuric acid having a concentration greater than 98.5% and less than 101% at temperatures greater than 120° C. This method comprises containing the acid in a conduit or vessel constituted of an Fe/Cr, Ni/Cr or Fe/Cr/Ni alloy having an austenitic, ferritic, or duplex structure and having a corrosion index corresponding to the algorithm set forth hereinabove. Particularly preferred alloys have compositiions falling within the ranges particularly specified hereinabove.

Further in accordance with the invention, a method has been discovered for condensing sulfuric acid vapor from a gas stream saturated with sulfuric acid vapor at a temperature above 120° C. This method is of important value in reducing the dew point of the gas stream so as to reduce its corrosive-ness to materials or equipment with which it may later come into contact. It is particularly useful in cooling and reducing the dew point of gas exiting the heat recovery zone in the heat recovery process of the present invention. In accordance with the novel method for condensing sulfuric acid vapor, the saturated gas stream is brought into contact with a heat transfer surface having a temperature below the saturation temperature of the gas with respect to sulfuric acid vapor, but above 120° C. and high enough so that the sulfuric acid which condenses on the heat transfer surface has a concentration greater than 98.5%. The heat transfer surface is comprised of a ferrous alloy containing chromium, an iron-nickel alloy containing chromium, or a nickel alloy containing chromium, and has either an austenitic, ferritic, or duplex structure. The composition of the alloy further corresponds to the corrosion index set forth hereinabove.

The novel method for condensing sulfuric acid vapor from a saturated gas stream may be implemented, for example, by passing the gas stream exiting the heat recovery tower of the invention through an economizer having tubes constituted of the above described alloy, and controlling the temperature of the cooling fluid inside the economizer tubes so that the outside of the tube wall in contact with the gas stream and condensate has a temperature greater than 120° C. and high enough so that the condensate has a concentration greater than 98.5%.

EXAMPLE 1

Static corrosion immersion tests were carried out in hot concentrated sulfuric acid over a range of temperatures to determine the corrosion resistance of carbon steel and various alloy metals whose compositions are set forth in Table 1.

TABLE 1

Chemical Compositions of Alloys Used in This Study, Weight Percent
Values are reported heat analyses or analyses of the samples used in this
study. Parentheses indicate middle of specification range rather than
measured values.

|  | Fe | Cr | Ni | Mo | Si | Cu | Other |
|---|---|---|---|---|---|---|---|
| *Steels* | | | | | | | |
| Carbon Steel | (99) | 0.04 | — | — | 0.02 | 0.01 | 0.046 Al |
| Carpenter Iron C | (94) | — | — | — | 3.9 | 0.07 | |
| *400 Stainless Steel* | | | | | | | |
| 430 | 82.7 | 15.77 | 0.25 | 0 | 0.49 | 0 | |
| *"18-8" Stainless Steels* | | | | | | | |
| 303 | (69.2) | 18.15 | 9.44 | 0.32 | 0.52 | 0.34 | 0.23 S |
| 304 | 70.37 | 18.35 | 8.95 | 0.19 | 0.64 | 0.16 | |
| 309 | 60.54 | 22.8 | 14.63 | 0 | 0.38 | 0 | |
| *High Temperature Stainless* | | | | | | | |
| 310 | 52.5 | 24.04 | 21.33 | 0 | 0.46 | 0 | |
| *"18-18" with high Si* | | | | | | | |
| Nitronic 60 | 61.37 | 17.62 | (8.5) | 0.3 | 4.08 | — | 8 Mn, 0.13 N |
| Cronifer 1815 LCSi | 61.5 | 18.2 | 14.85 | 0 | 3.95 | — | 0.008 C |
| *"18-8" with Mo* | | | | | | | |
| 316L | 67.12 | 17.3 | 10.98 | 2.1 | 0.65 | 0.35 | |
| 317 | (62.5) | (19) | (13) | (3.5) | <1 | — | |
| Nitronic 50 | (57.2) | (22) | (12.5) | (2.2) | <1 | — | .3 N, .2 V, .2 Cb |
| *Stainless for Sea Water* | | | | | | | |
| 904L | (45) | (21) | (25.5) | (4.5) | (0.4) | (1.5) | |
| 254 SMO | 54.22 | 20.2 | 18.3 | 6.03 | 0.33 | 0.72 | 0.2 N |

TABLE 1-continued

Chemical Compositions of Alloys Used in This Study, Weight Percent
Values are reported heat analyses or analyses of the samples used in this study. Parentheses indicate middle of specification range rather than measured values.

| | Fe | Cr | Ni | Mo | Si | Cu | Other |
|---|---|---|---|---|---|---|---|
| Sanicro 28 | (35.5) | (27) | (31) | (3.5) | 0 | <1 | |
| Ferralium 255 | (62) | (25.7) | (5.5) | (3) | (<1) | (1.7) | 0.17 N |
| "329" type Stainless | | | | | | | |
| 44 LN | (64.8) | 25 | 6.2 | 1.7 | 0.4 | 0 | 0.16 N min. |
| Carp 7 Mo | 66.04 | 26.58 | 3.98 | 1.42 | 0.48 | 0 | |
| Special Ferritic Stainless | | | | | | | |
| E-Brite 26-1 | (72.55) | (26) | — | (1) | — | — | 0.1 Cb |
| 29-4-2 | 64.73 | 29.0 | 2.36 | 3.76 | 0.1 | 0 | |
| Intermediate Nickel Alloys | | | | | | | |
| Carpenter 20 Cb-3 | 39.4 | 19.46 | 33.03 | 2.14 | 0.46 | 3.28 | 0.72 Cb + Ta |
| Incoloy 825 | 28.2 | 23.28 | 42.25 | 2.7 | 0.15 | 1.77 | |
| Incoloy 800 | (46) | (21) | (32.5) | — | (0.5) | (0.4) | .4 Al, .4 Ti |
| Hastelloy G | (19.5) | (22) | (46) | (6.5) | (0) | (2) | |
| Nickel Alloys | | | | | | | |
| Hastelloy B2 | 0.79 | 0.78 | 71 | 27.5 | 0.03 | | 0 |
| Hastelloy C276 | 5 | 15.47 | 69 | 15.21 | 0.02 | | — |
| Inconel 625 | 2.5 | 21.06 | 69.3 | 9.28 | 0.36 | | 0 |
| Inconel 600 | 8 | 14.96 | 75.88 | 0 | 0.26 | | 0.11 |
| Lewmet Alloys | | | | | | | |
| Lewmet 44 | (16) | (31) | (36) | (2) | (3.25) | (3) | 6 Co, 3 Mn |
| Lewmet 55 | (16) | (31) | (34) | (3.5) | (3.5) | (3) | 6 Co, 3 Mn |
| Lewmet 66 | (16) | (31) | (37) | (<.4) | (3.0) | (3) | 6 Co, 3 Mn |

For purposes of these tests, samples were cut to a size of approximately 10 mm×6 mm×2 mm and the surfaces of the samples ground smooth with a 120-grit belt surface grinder. These samples were immersed in various sulfuric acid solutions in 80 ml capacity Teflon cups fabricated by Savillex Corporation. The cups were provided with screw caps designed to afford a seal. A glass rod grid was inserted in the bottom of each cup to support the sample with minimum contact, so that there would be little difference between the areas of exposure to the acid on the top and bottom of the sample. After the sample was placed on the glass grid, a portion of sulfuric acid (50 ml) of the desired strength was poured into the cup, thus providing a ratio of acid volume to sample surface area of 29 ml/cm², a ratio within the range of 20-40 ml/cm², as recommended in ASTM Method G-31. The acid solutions used in the corrosion tests were prepared by mixing 98% by weight sulfuric acid (Axton-Cross) with either water, to provide solutions more dilute than 98%, or with 20% oleum to provide solutions of a strength greater than 98%. Acid concentrations were determined by measuring the conductivity of the solution at a prescribed temperature. After the acid solution was poured into a cup containing a corrosion sample, the cup was sealed and inserted into an oven at the test temperature and the sample exposed to the acid solution at that temperature for seven days. After exposure, the cup was removed from the oven and allowed to cool, and the sample then removed and rinsed. Most samples required no extensive clean-up after rinsing, but some were cleaned with a rubber eraser to remove an adherent film. Thereafter, the samples were weighed to determine loss of mass on corrosion, and from such loss of mass the linear corrosion rates were determined. Set forth in Table 2 is a compilation of the data obtained in these static immersion tests. This data provided the basis for the corrosion index set forth hereinabove.

TABLE 2

STATIC IMMERSION SCREENING TESTS FOR ALLOYS IN $H_2SO_4$ (Corrosion Rate: mm/year)

| | Temp. °C. | | | | | | |
|---|---|---|---|---|---|---|---|
| | 99.1 | | 115.7 | 143.5 | | 199.1 | |
| | % $H_2SO_4$ | | | | | | |
| ALLOY | 97.65 | 98.45 | 97.65 | 99.2 | 100 | 99.2 | 100 |
| E-BRITE | 0.06 | 0.02 | 0.07 | 0 | 0 | 0.03 | 0.02 |
| 29-4-2 | 0.08 | 0.02 | 0.11 | 0.01 | 0 | 0.02 | 0 |
| Ferralium 255 | 0.07 | — | 0.11 | 0.03 | — | 0.03 | 0.01 |
| 310 | 0.08 | 0.02 | 0.56 | 0.02 | 0 | 0.03 | 0.01 |
| Carp 7 Mo | — | — | — | — | — | 0.04 | — |
| 44LN | — | — | — | — | — | 0.05 | — |
| Lewmet 66 | 0.03 | 0.06 | 0.14 | 0.04 | 1.5 | 0.05 | 0.05 |
| 309 | — | — | — | — | — | 0.05 | — |
| Incoloy 800 | 0.08 | 0.07 | 0.42 | 0.06 | 0 | 0.07 | 0.03 |
| 430 | — | — | — | — | — | 0.08 | — |
| Incoloy 825 | 0.10 | 0.11 | 0.43 | 0.11 | 0.06 | 0.09 | 0.02 |
| Nitronic 60 | 0.09 | 0.02 | 0.59 | 0.04 | 0.06 | — | — |
| 304L | 0.38 | 0.32 | 0.75 | 0.03 | 0.06 | 0.09 | 0.05 |
| 317 | 0.05 | — | 0.57 | 0.16 | — | 0.09 | 0.02 |
| Cronifer 1815 | 0.02 | 0.02 | 1.45 | 0.20 | 0.03 | 0.14 | 0.07 |
| 316L | 0.10 | 0.07 | 0.80 | 0.08 | 0.12 | 0.12 | 0.04 |
| Inconel 600 | 0.26 | 0.08 | — | — | 0.19 | — | — |
| Lewmet 55 | 0.07 | 0.04 | 0.64 | 0.06 | 0.25 | — | 0.12 |
| Nitronic 50 | 0.06 | 0.07 | 0.51 | 0.07 | 0.22 | — | — |
| Lewmet 44 | 0.04 | 0.08 | 0.43 | 0.10 | 0.58 | — | 0.09 |
| Sanicro 28 | 0.08 | 0.15 | 0.43 | 0.11 | 0.72 | — | 0.02 |
| Carp. 20 CB3 | — | 0.11 | 0.54 | 0.05 | 0.80 | 0.13 | 0.03 |
| 904L | — | 0.37 | 0.64 | 0.19 | 0.73 | — | 0.02 |
| 303 | — | — | — | — | — | 0.19 | 0.43 |
| Inconel 625 | 0.26 | 0.17 | — | — | 0.90 | — | — |
| 254 S Mo | 0.13 | — | 0.63 | 0.20 | 1.02 | — | 0.02 |
| Hastelloy G | 0.52 | 0.14 | 0.60 | 0.18 | 0.95 | — | 0.09 |
| Hastelloy C-276 | 0.34 | 0.18 | 1.09 | 0.28 | 1.76 | 0.29 | 0.21 |
| Hastelloy B2 | — | 0.17 | 0.33 | 0.49 | 2.77 | 2.90 | 1.59 |
| Carp. Iron C | 1.72 | 2.62 | — | — | 0.38 | — | — |
| Carbon Steel | — | — | — | — | — | >150 | >150 |

Collated in Table 3 is data at a variety of acid concentrations for several alloys, including certain alloys which exhibited favorable corrosion resistance based on the data of Table 2. Among the specific alloys for which corrosion data is presented in Table 3 are E-Brite Alloy 26-1, a ferritic stainless steel, Alloy 255 duplex stainless steel, Alloy 304L, an austenitic stainless steel, and Alloy C276, a high nickel alloy. Other alloys for which data is presented in Table 3 are 304L stainless, 310 stainless and Alloy 29-4-2. This data illustrates the very significant effect of small differences in acid concentration on the corrosion rates of these alloys. Thus, the stainless steel alloys experience as much as a 35-fold increase in the corrosion rate when the sulfuric acid concentration is decreased from 100 weight percent acid to approximately 98%. Alloy C276 shows a reduction in corrosion in the 98–99% concentration range, but the corrosion rate increases between 99% and 100%. If the Alloy C276 data is compared with any of the stainless steel data, it can easily be seen that there is a considerable advantage for stainless steel alloys when used in accordance with the teachings of this invention.

At the elevated temperatures normally encountered in the heat recovery tower and heat exchanger many alloys become more passive, or resistant to corrosion. This effect can be seen to prevail for a number of alloys as illustrated by the data given in Table 3.

Figure 6:
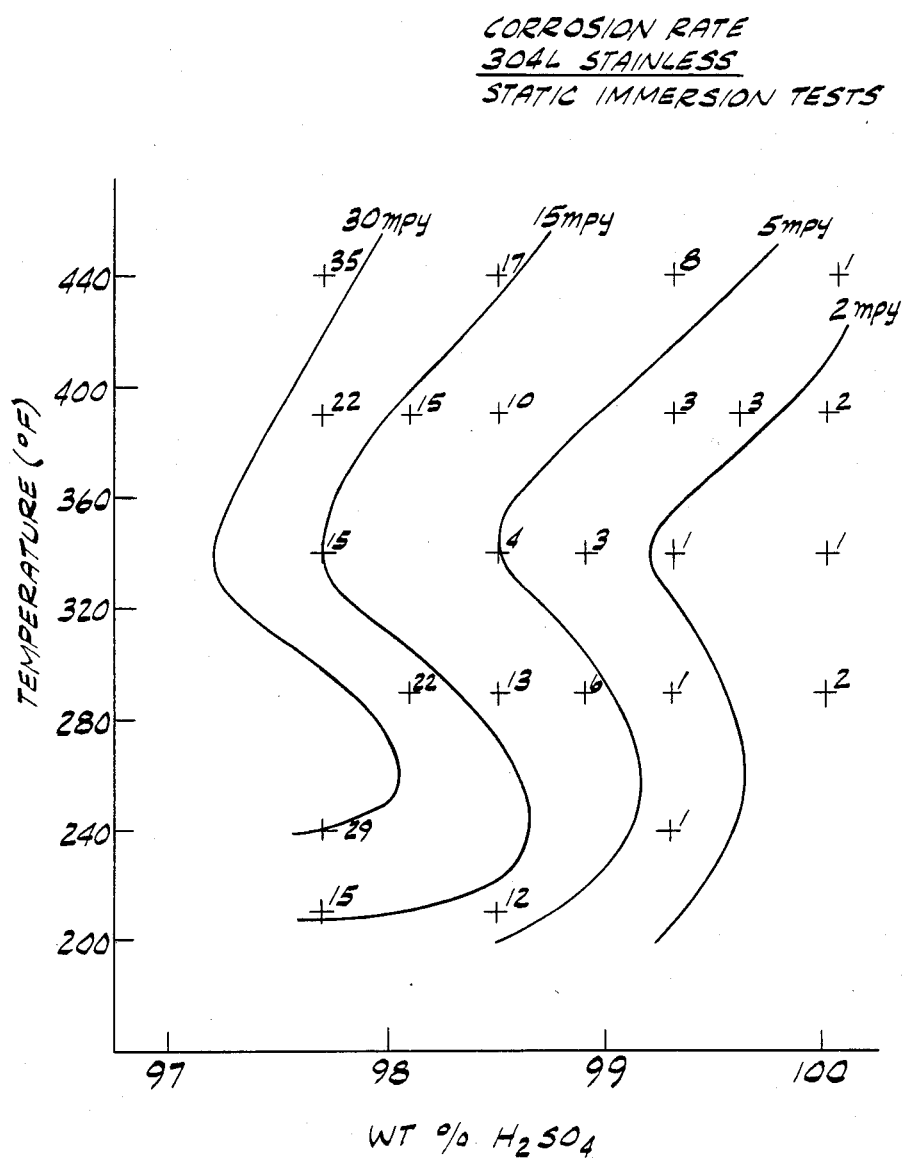
FIG. 6 is a sulfuric acid temperature/concentration diagram having plotted thereon corrosion data and estimated isocorrosion curves for type 304L stainless steel.

Set forth in FIG. 6 are estimated isocorrosion curves based on the data of Table 3 for type 304L stainless steel. It may be noted that the isocorrosion curves of FIG. 6 are not straight. The data of Table 3 shows the corrosion rate increasing rapidly with temperature in the range of 250° C. and exposure to 97–98% acid concentration. However, for acid concentrations between 99–100%, the temperature effect was found not to be substantial. It may be noted that the isocorrosion curves of FIG. 6 exhibit an "S"0 shape, resulting from an actual decrease in corrosion as a function of temperature in elevated temperature regions typically above 130° C.

TABLE 4

Chemical Analysis of Type 310S Stainless Steel Used in Static Immersion Tests

| Element | Weight Percent |
|---|---|
| C | 0.055 |
| Fe | 52.5 |
| Cr | 24.04 |
| Ni | 21.33 |
| Si | 0.46 |

Figure 8:
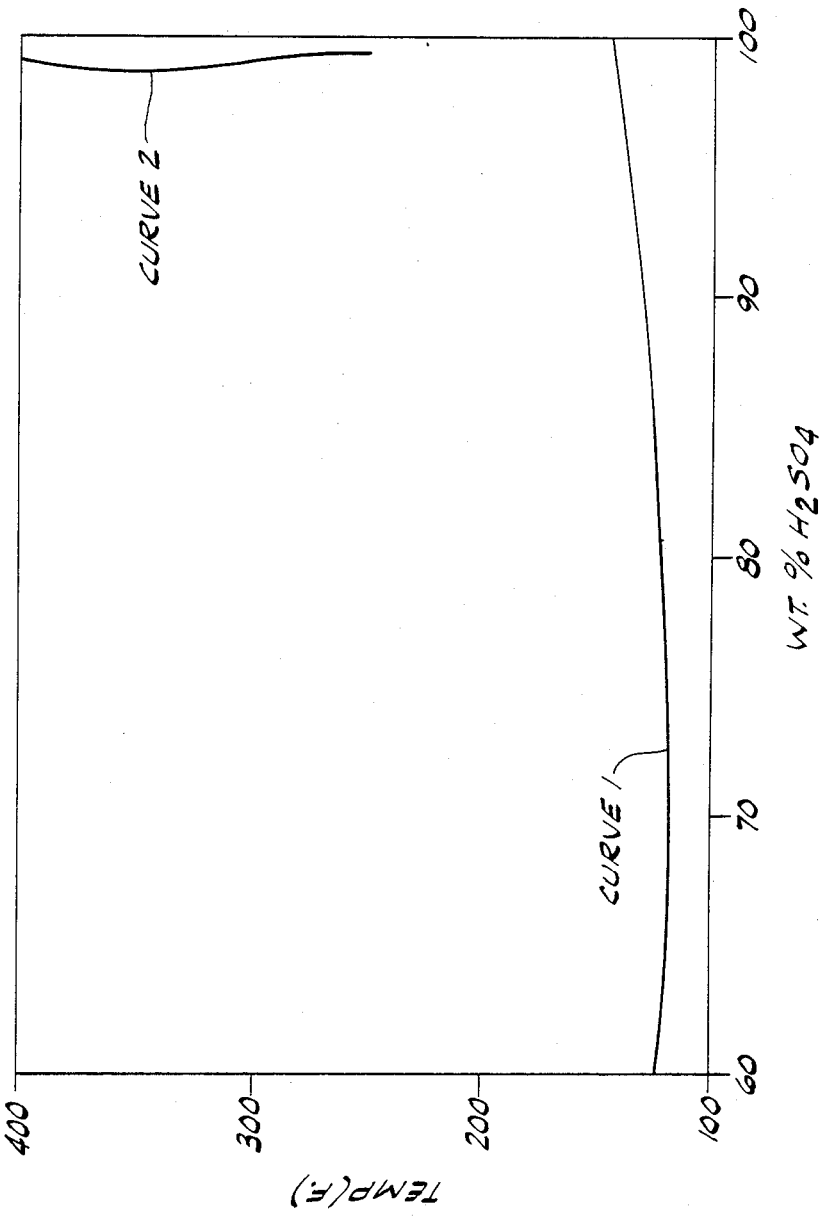
FIG. 8 is a plot showing both the literature 5 mpy isocorrosion curve for Incoloy 825 in sulfuric acid and the approximate 5 mpy isocorrosion curve for Incoloy 825 in the 98%–100% acid concentration region as determined in the course of the development of the improved process of the invention.
Figure 9:
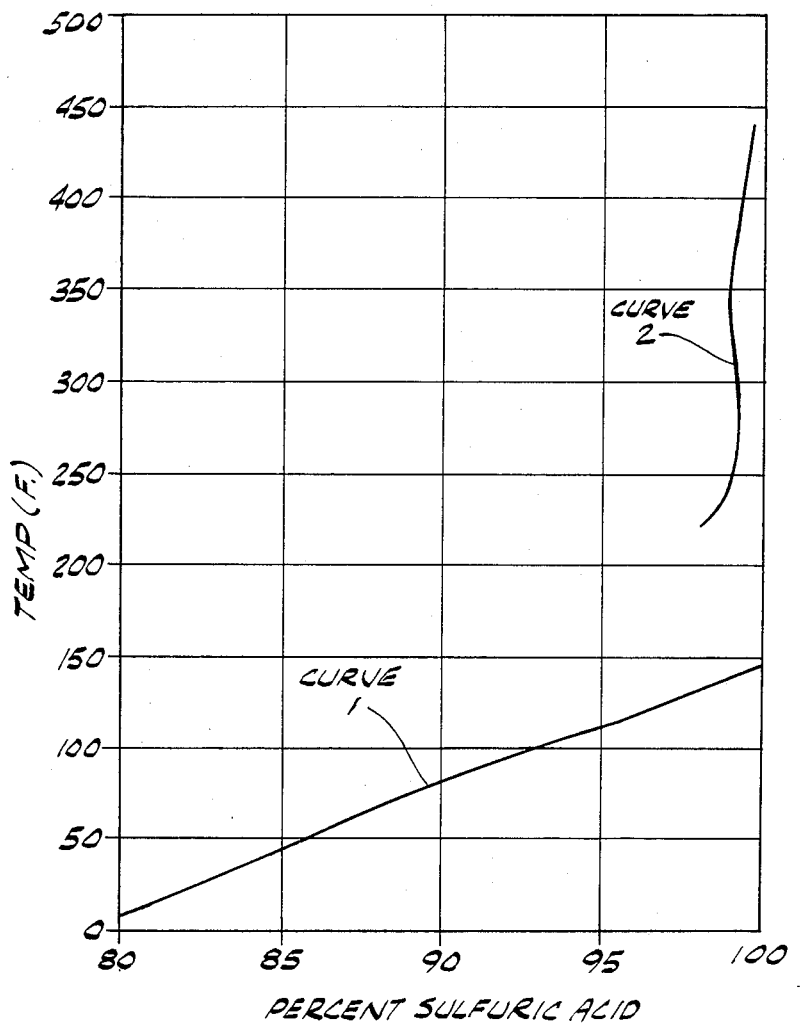
FIG. 9 is a plot showing both a literature 5 mpy isocorrosion curve for type 316 stainless steel in sulfuric acid and the approximate 5 mpy isocorrosion curve for type 316 stainless steel in the 98% to 100% concentration region as determined in the course of the development of the improved process of the invention.
Figure 10:
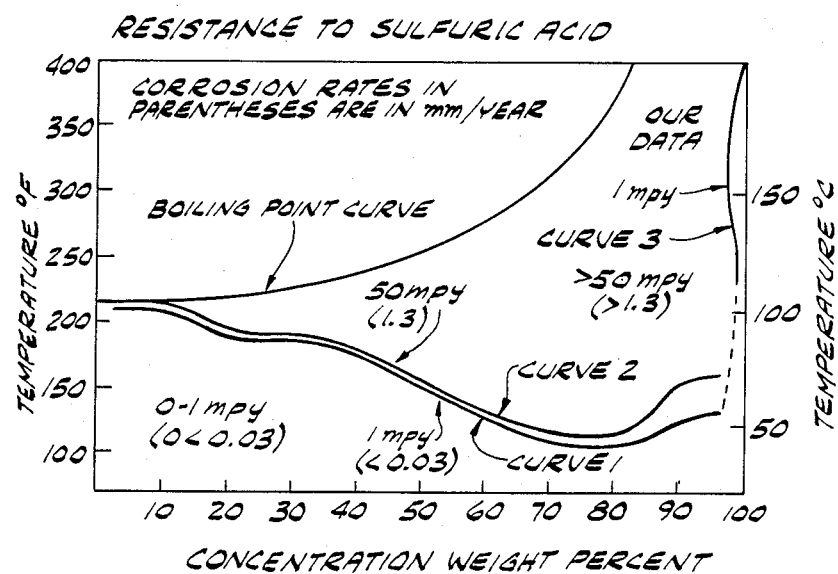
FIG. 10 is a plot showing literature 1 mpy and 50 mpy isocorrosion curves for Ferralium Alloy 255 in sulfuric acid and the approximate 1 mpy isocorrosion curve for Ferralium in the 98% to 100% concentration region as determined in the course of the development of the improved process of the invention.
Figure 11:
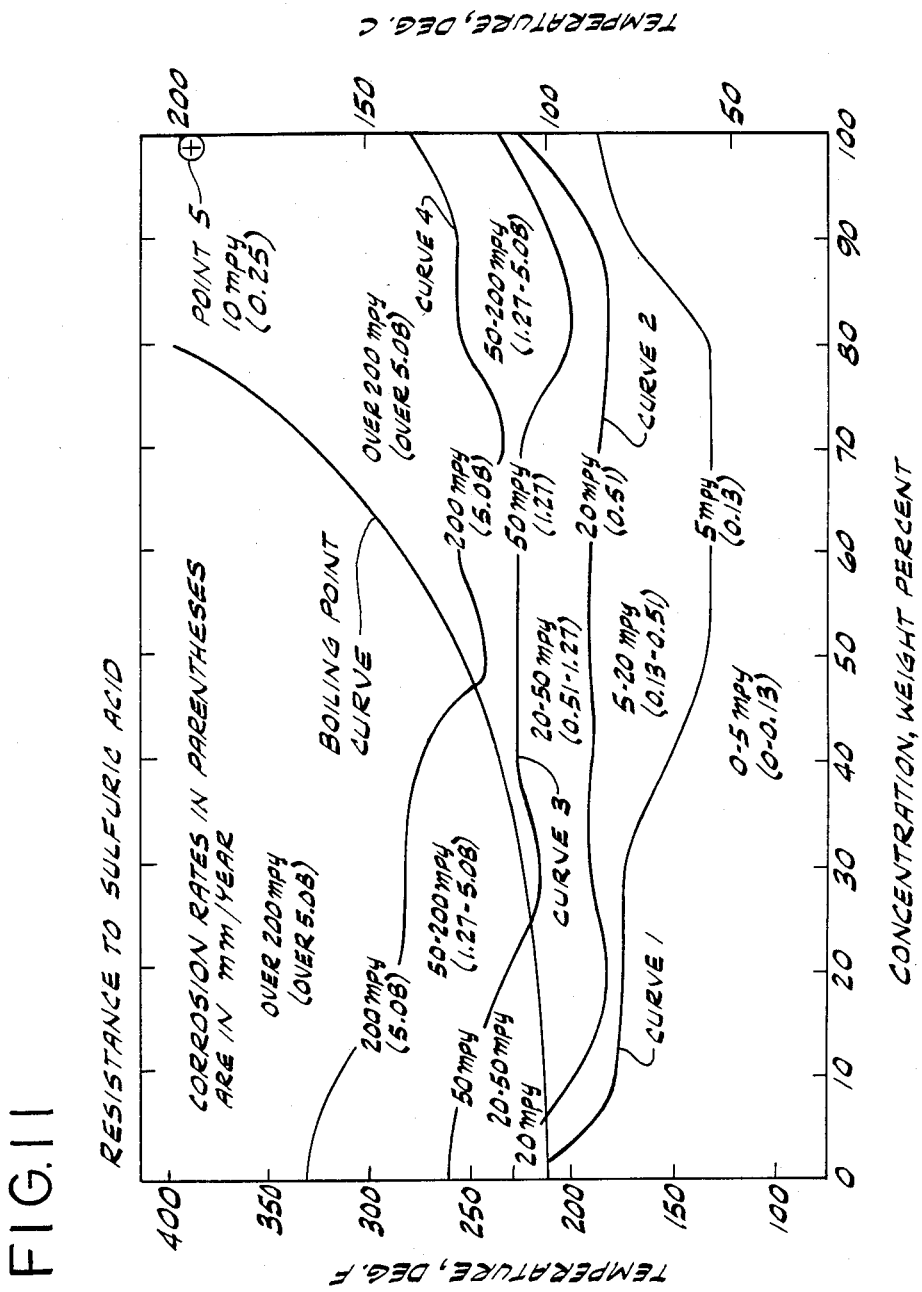
FIG. 11 is a plot showing several isocorrosion curves for Hastelloy C-276 in sulfuric acid, having plotted thereon a point showing the corrosion rate for Alloy C-276 in the 98% to 100% region as determined in the course of the development of the process of the invention.

FIGS. 8 to 10 illustrate the unexpected results observed in the corrosion tests of Example 1. Thus, in the temperature concentration diagram of FIG. 8, curve 1 is the isocorrosion curve at 5 mpy for Incoloy 825 as reported in FIG. 38 of *International Nickel Company Corrosion Engineering*, "Bulletin CEB-1"0 (January 1983), while curve 2 is the approximate 5 mpy (0.13 mm/yr) isocorrosion curve in the 98–100% acid region for Incoloy 825 as derived from data obtained in the above-described static immersion tests. In Fig. 9, curve 1 is based on 5 mpy (0.13 mm/yr) corrosion data published by Fontana for 316 stainless steel, while curve 2 is the approximate 5 mpy (0.13 mm/yr) isocorrosion curve as derived from the above-described test. In FIG. 10, curves 1 and 2 are the 1 mpy and 50 mpy isocorrosion curves for Ferralium Alloy 255 as published by Cabot Corporation, while curve 3 is the approximate 1 mpy (0.03 mm/yr) isocorrosion curve in the 98–100% sulfuric acid region as derived from the above-described corrosion test. In FIG. 11, curves 1-4 are isocorrosion curves for Hastelloy C-276 as published at

TABLE 3

STATIC IMMERSION CORROSION TEST RESULTS FOR SELECTED ALLOYS IN H$_2$SO$_4$
(Rate: mm/year)

| | °C. | | | | | | | | | | | | | |
|---|---|---|---|---|---|---|---|---|---|---|---|---|---|---|
| | 99.1 | | 115.7 | | 143.5 | | | | | | | 171.3 | | |
| | % H$_2$SO$_4$ | | | | | | | | | | | | | |
| Alloy | 97.65 | 98.45 | 97.65 | 99.2 | 96.85 | 97.65 | 97.94 | 98.45 | 98.85 | 99.2 | 100. | 96.85 | 97.65 | 98.45 |
| E-BRITE 26-1 | 0.06 | 0.02 | 0.07 | 0 | — | — | 0.04 | 0.03 | 0 | 0.02 | 0 | — | — | 0.02 |
| 29-4-2 | 0.08 | 0.02 | 0.11 | 0.01 | — | — | 0.29 | 0.02 | 0 | — | 0 | — | — | 0 |
| Ferralium 255 | 0.07 | — | 0.11 | 0.03 | — | — | 0.22 | 0.02 | 0.01 | — | — | — | — | 0.01 |
| 310 | 0.08 | 0.02 | 0.56 | 0.02 | — | — | 0.05 | 0.03 | 0.17 | 0 | — | — | — | 0.02 |
| 304L | 0.39 | 0.32 | 0.75 | 0.03 | — | — | 0.57 | 0.33 | 0.16 | 0.03 | 0.06 | 1.27 | 0.39 | 0.11 |
| 316L | 0.10 | 0.07 | 0.80 | 0.08 | 1.50 | 0.89 | — | 0.51 | — | 0.11 | 0.12 | — | — | — |
| Hastelloy C276 | 0.34 | 0.18 | 1.09 | 0.28 | — | — | 1.56 | 0.83 | 0.52 | 0.33 | 1.76 | — | — | 0.35 |

| | °C. | | | | | | | | | | | | |
|---|---|---|---|---|---|---|---|---|---|---|---|---|---|
| | 171.3 | | | 199.1 | | | | | | 226.9 | | | |
| | % H$_2$SO$_4$ | | | | | | | | | | | | |
| Alloy | 98.85 | 99.2 | 100. | 96.85 | 97.65 | 98.45 | 99.2 | 99.6 | 100 | 97.65 | 98.45 | 99.2 | 100. |
| E-BRITE 26-1 | 0.02 | 0 | 0.02 | — | — | — | 0.03 | 0.03 | 0.02 | 0.37 | 0.20 | 0.03 | 0.01 |
| 29-4-2 | 0 | 0 | 0 | — | — | — | 0.02 | 0.04 | 0 | 0.34 | 0.08 | 0 | 0 |
| Ferralium 255 | 0 | 0 | 0 | — | — | — | 0.03 | — | 0.01 | 0.58 | 0.18 | 0.05 | 0.02 |
| 310 | 0 | 0 | 0.02 | — | 0.23 | — | 0.03 | — | 0.01 | 0.35 | 0.20 | 0.03 | 0.02 |
| 304L | 0.07 | 0.04 | 0.04 | — | 0.56 | 0.28 | 0.09 | 0.08 | 0.05 | 0.89 | 0.43 | 0.21 | 0.03 |
| 316L | — | — | — | 0.79 | 1.93 | 0.25 | 0.12 | — | 0.04 | — | — | — | — |
| Hastelloy C276 | 0.27 | 0.23 | 0.33 | — | — | — | 0.29 | 0.25 | 0.21 | 0.47 | 0.24 | 0.13 | 0.20 |

Figure 7:
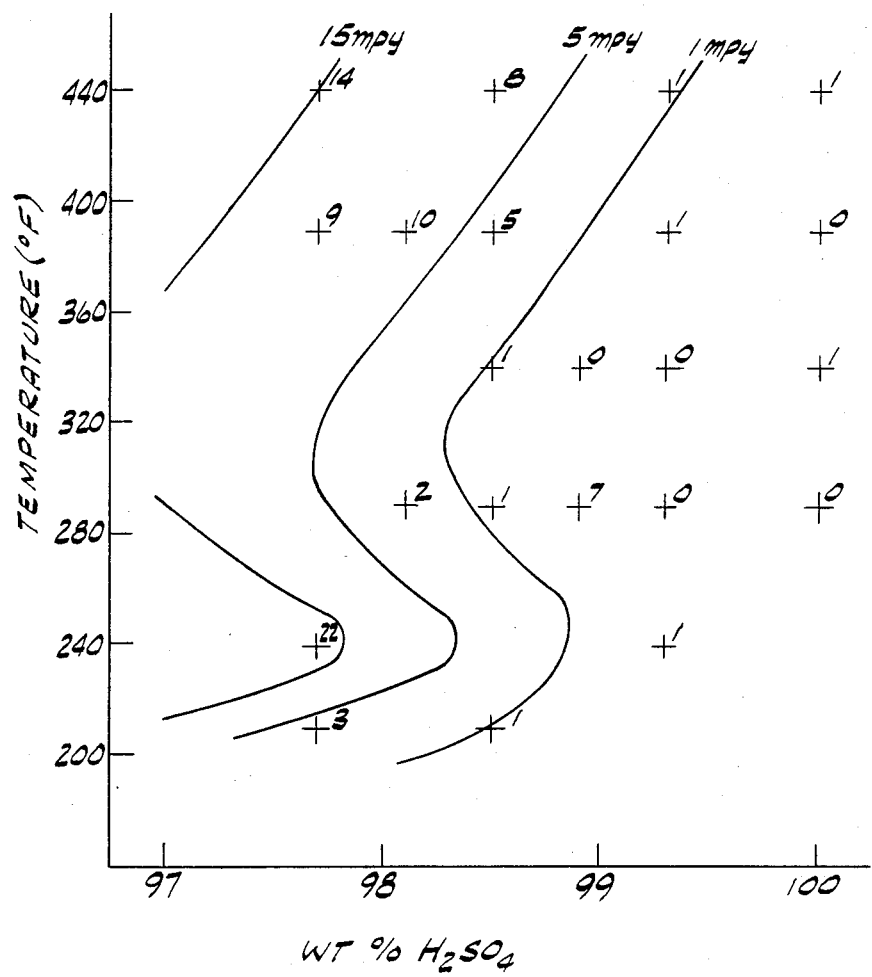
FIG. 7 is a plot comparable to FIG. 6 but for type 310S stainless steel.

Set forth in FIG. 7 is a plot of corrosion data of Table 3 on a temperature vs. acid concentration diagram for Type 310S stainless. Also set forth in FIG. 7 are estimated isocorrosion curves. Chemical analysis of the Type 310S stainless steel used in the static immersion tests of this example is set forth in Table 4.

page 75 of Cabot Corporation's "Corrosion Resistance of Hastelloys"0 (1980). Inscribed as point 5 on FIG. 11 is the data obtained for this alloy in the above-described test.

EXAMPLE 2

Despite the generally favorable results obtained in the static immersion tests described in Example 1, tests of such nature cannot necessarily be relied upon as a basis for specifying materials of construction for the tubes of a heat exchanger cooling hot absorber acid. Static tests do not provide a satisfactory basis for determining whether the alloys involved are or may be subject to active-passive type corrosion. In order to provide a further assessment of the suitability of various alloys in absorber acid cooler service at elevated temperatures, electrochemical tests were carried out to establish the stability of the passivation process under specific conditions. In these tests, the voltage was monitored during approach to the freely corroding potential (FCP). Once the FCP was reached, potentio-dynamic scans were used to assess stability. Tests were run under the following conditions:

(A) type 304 stainless steel and 99.2% sulfuric acid at 143° C., 171° C. and 199° C.;

(B) same conditions as (A) but the acid was purged with a gas mixture to simulate the absorber atmosphere, i.e., nitrogen containing 5% by volume oxygen and 0.5% by volume sulfur dioxide;

(C) type 310 stainless steel under the same conditions as (A);

(D) E-Brite 26-1 in 100% sulfuric acid at 143° C. and 171° C.

Figure 12:
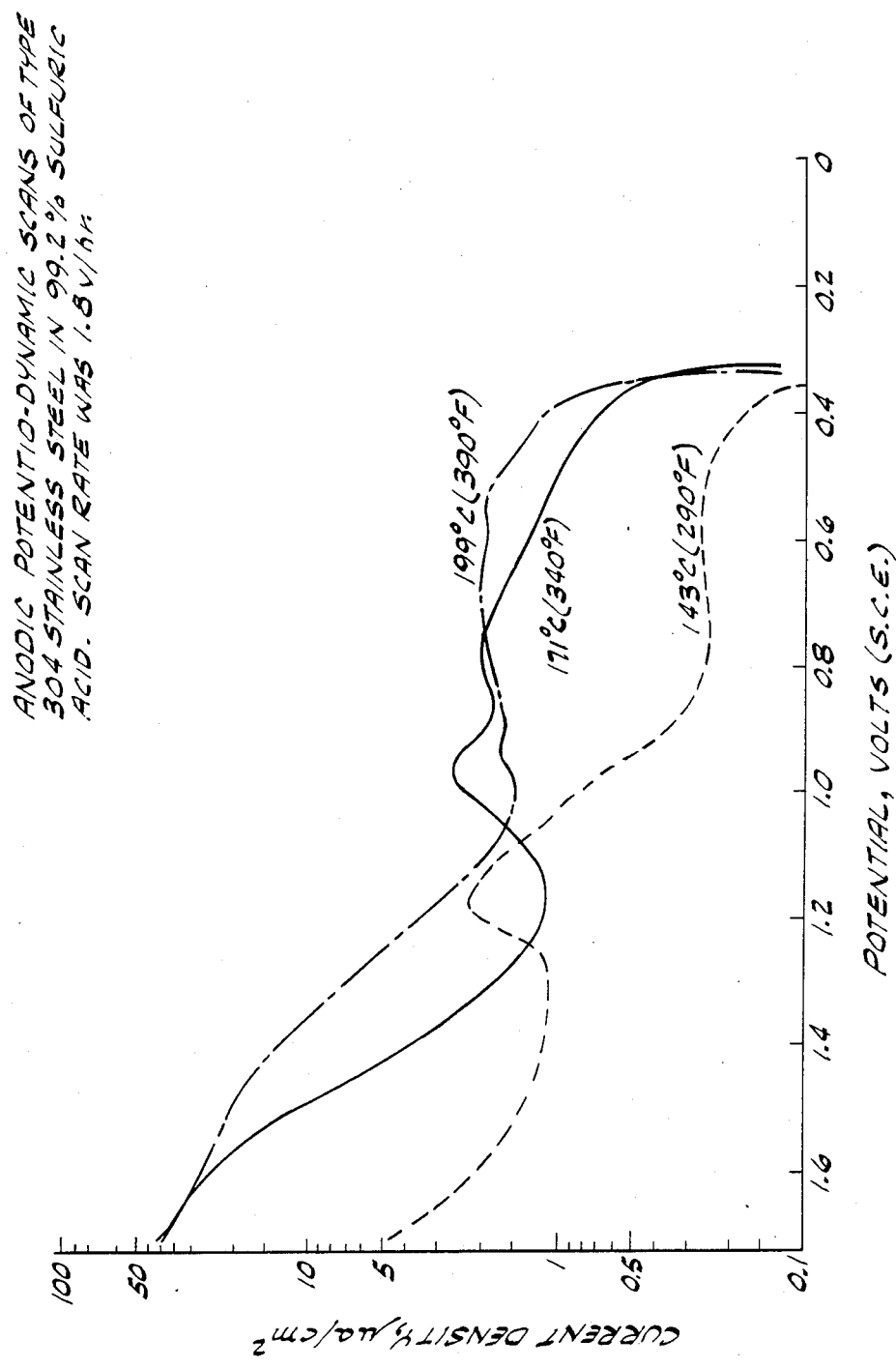
FIG. 12 shows anodic potentiodynamic scans for type 304 stainless steel in 99.2% sulfuric acid at a scan rate of 1.8 v/hr.

In test series (A) for 304 stainless steel, the acid was taken directly from a carboy and no attempt was made to aerate or purge the acid before or during the electrochemical tests. After an electrochemical cell was set up and the desired temperature achieved, the circuit was left open and the cell was allowed to stabilize at the FCP. Table 5 shows the freely corroding potential at the various temperatures involved in this test. After the FCP was established at each test temperature, an anodic scan was run at 1.8 volts per hour. The scans were then reversed and the voltage was allowed to decrease until the current reached $10^3$ microamps/cm$^2$ in the cathodic direction. The voltage was then turned off and the cell allowed to again reach the FCP. These last FCPs are also shown in Table 5. The anodic scans are shown in FIG. 12.

TABLE 5

| Freely Corroding Potentials (FCPs) for Type 304 Stainless Steel in 99.2% Sulfuric Acid | | |
|---|---|---|
| | Freely Corroding Potentials, Volts (S.C.E.) | |
| | Before scan | After scan |
| 143° C. (290° F.) | +.343 | +.309 |
| 171° C. (340° F.) | +.330 | — |
| 199° C. (390° F.) | +.334 | +.329 |

The FCPs shown in Table 5 were found to be very stable since all settled out in less than one hour, except for the FCP at 143° C. after the cathodic scan, in which case two hours were required. Such behavior indicates a system with a strong tendency to passivity. Moreover, the shape of the anodic scans indicates that the natural corrosion potential is in the passive region of the potentiodynamic curve. Based on the corrosion current, and assuming that the corrosion consists of oxidation of metallic iron to ferrous ion, the curves indicate corrosion rates of less than 0.013 mm/yr at 143° C. and about 0.025 mm/yr at both 171° C. and 199° C. These results are in good agreement with the immersion tests of Example 1.

Figure 13:
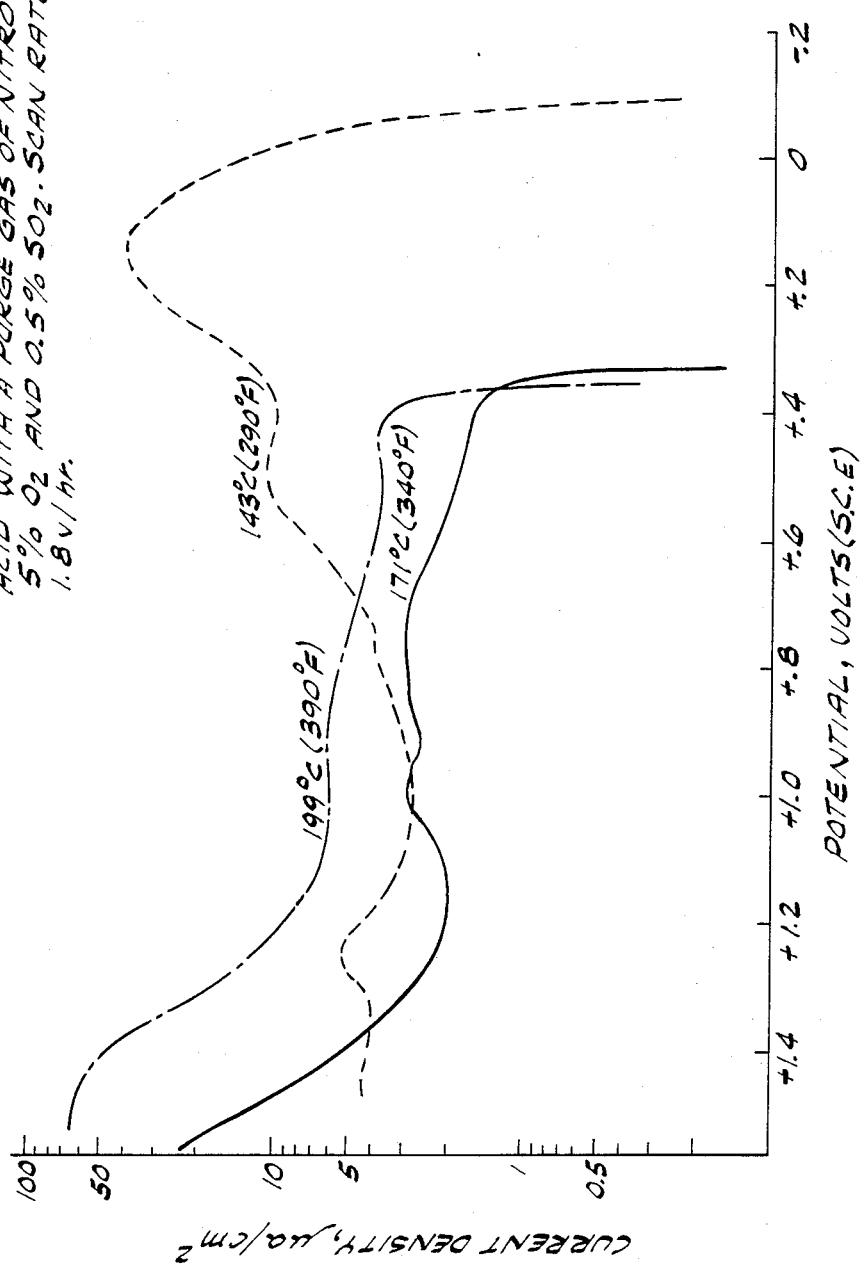
FIG. 13 shows anodic potentiodynamic scans for type 304 stainless steel in 99.2% sulfuric acid with a purge gas of nitrogen, 5% $O_2$ and 0.5% $SO_2$ at a scan rate of 1.8 v/hr.

In the electrochemical tests on 304 stainless steel in 99.2% sulfuric acid purged with nitrogen, 5% oxygen and 0.5% sulfur dioxide (Series (B) as described above) the test sequence was as follows: (1) establish FCP; (2) conduct a cathodic scan; (3) re-establish FCPs; (4) run an anodic scan; and (4) re-establish FCP. This sequence increased the severity of the test, since the cathodic scan was expected to strip the protective passive layer, and thus provided an evaluation of the ability of the alloy to repassivate under adverse conditions. The FCPs observed in the tests of series (B) are set forth in Table 6 with their anodic scans being shown in FIG. 13. The results under the conditions of series (B) reveal that at 143° C. the FCP is beyond the passive range and entering the active zone, but the scans at the two higher temperatures show that the type 304 stainless steel specimen is in a passive state.

TABLE 6

| Freely Corroding Potentials (FCPs) for Type 304 Stainless Steel in 99.2% Sulfuric Acid with a Nitrogen, 5% O$_2$, and 0.5% SO$_2$ Gas Purge | | | |
|---|---|---|---|
| | Freely Corroding Potentials, Volts (S.C.E.) | | |
| | Before scans | Before cathodic scan | After anodic scan |
| 143° C. (290° F.) | −.093 | +.110 | +.115 |
| 171° C. (340° F.) | +.343 | +.344 | +.335 |
| 199° C. (390° F.) | +.350 | +.360 | +.350 |

Figure 14:
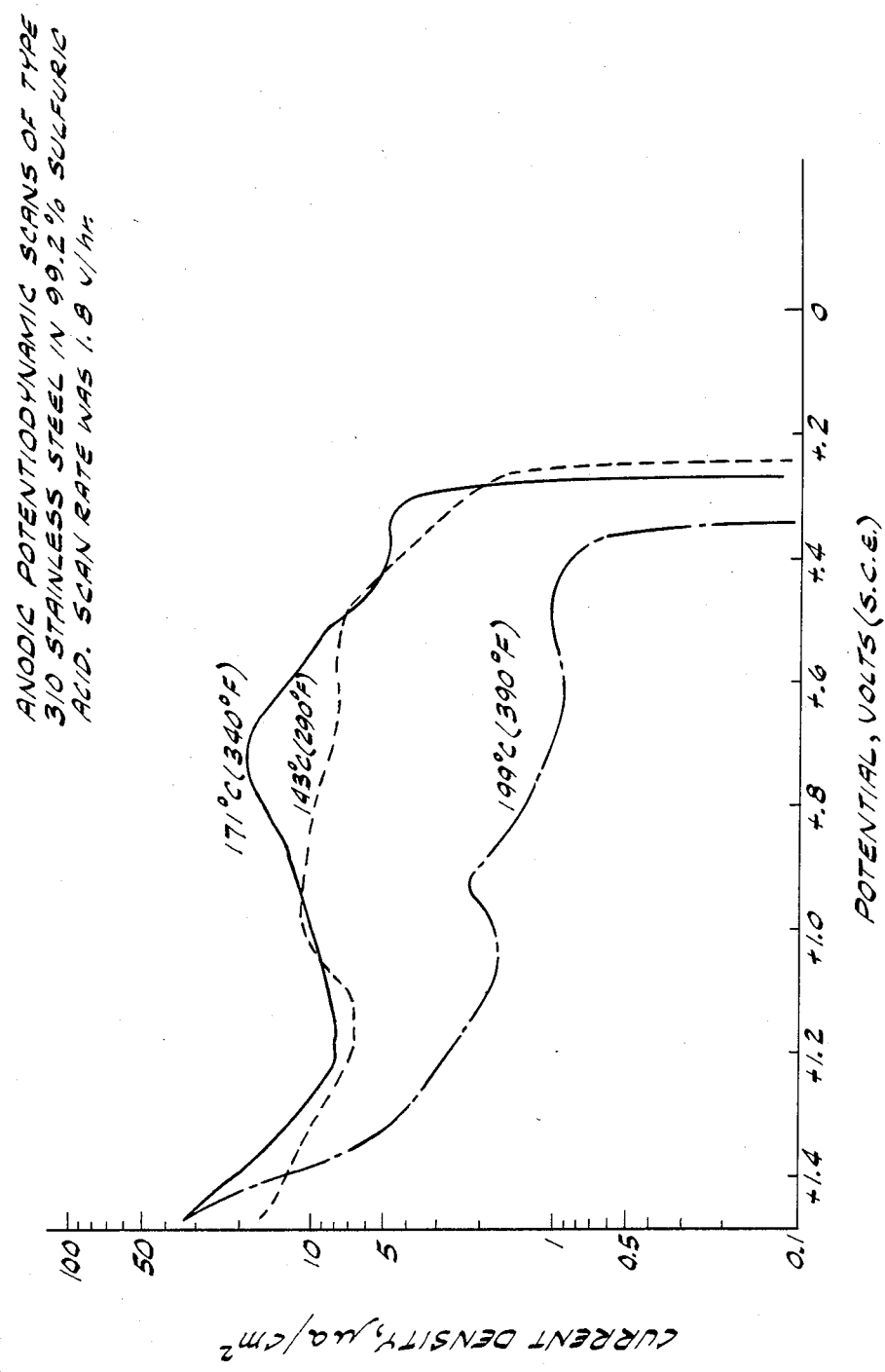
FIG. 14 shows anodic potentiodynamic scans for type 310 stainless steel in 99.2% sulfuric acid at a scan rate of 1.8 v/hr.

Table 7 shows the freely corroding potentials and FIG. 14 shows the three anodic scans for the tests of series (C) for type 310 stainless steel. The voltage traces for 143° C. (290° F.) and 171° C. (340° F.) showed initial instability and active-passive behavior for less than five minutes, but then gradually approached their stable FCP. In at least three of the four FCPs measured, one hour was required to achieve a stable voltage. The scans in FIG. 14 indicate higher corrosion rates for the passive regions at the two lower temperatures, approximately 0.13 mm/yr and up to approximately 0.23 mm/yr, but only approximately 0.012 mm/yr at 199° C. (390° F.).

TABLE 7

| Freely Corroding Potentials (FCPs) for Type 310 Stainless Steel in 99.2% Sulfuric Acid (Parentheses Indicate That Value Might be Higher Than Shown.) | | |
|---|---|---|
| | Freely Corroding Potentials, Volts (S.C.E.) | |
| | Before scan | After scan |
| 143° C. (290° F.) | +.245 | — |
| 171° C. (340° F.) | (+.271) | — |
| 199° C. (390° F.) | +.342 | +.317 |

Figure 15:
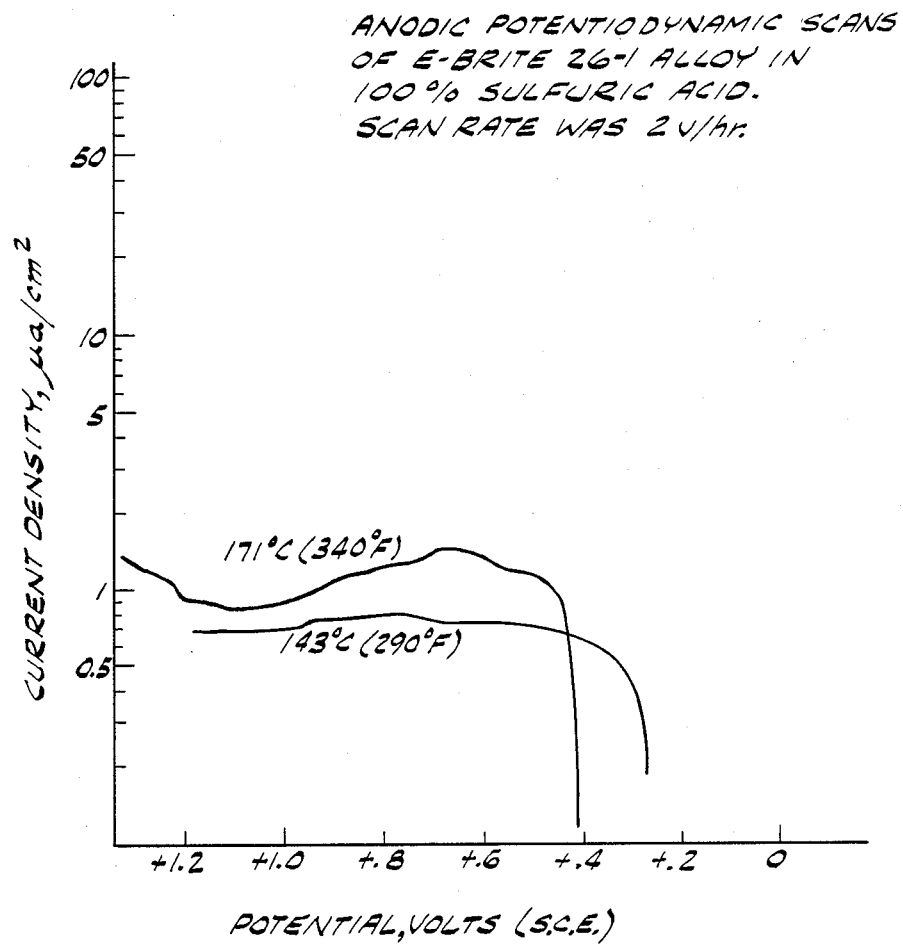
FIG. 15 shows anodic potentiodynamic scans for E-Brite 26-1 in 100% sulfuric acid at a scan rate of 2 v/hr.

In series (D), for E-Brite 26-1, only two temperatures were evaluated, i.e., 143° C. and 171° C. The freely corroding potentials are shown in Table 8, and the potentiodynamic scan curves are shown in FIG. 15. These results both reflect a very stable passivation situation. Calculated passive corrosion rates are less than about 0.012 mm/yr and thus in excellent agreement with immersion test results shown in Table 3.

TABLE 8

| Freely Corroding Potentials (FCPs) for E-Brite 26-1 Alloy in 100% Sulfuric Acid | | | |
|---|---|---|---|
| | Freely Corroding Potentials, Volts (S.C.E.) | | |
| | Before scans | After cathodic scan | After anodic scan |
| 143° C. (290° F.) | 0.227 | — | — |
| 171° C. (340° F.) | 0.408 | 0.408 | 0.390 |

Based on the static corrosion tests of Example 1, as generally corroborated by the electrochemical tests of Example 2, the alloys tested were ranked according to their relative suitability for use as the material of construction of the tubes of a heat exchanger for recovery suitability for use in the heat recovery process of the invention remains consistently valid.

TABLE 9

| Rank* | Material | Type+ | CI | CI > 39 | CI < 38 | 39 > CI > 38 |
|---|---|---|---|---|---|---|
| 1 | E-Brite 26-1 | S | 43.5 | x | | |
| 2 | 29-4-2 | S | 43.2 | x | | |
| 3 | Ferralium 255 | S | 41.5 | x | | |
| 4 | 310 | S | 41.6 | x | | |
| 5 | Carpenter 7 MO | S | 42.7 | x | | |
| 6 | 44 LN | S | 41.8 | x | | |
| 7 | Lewmet 66 | N | 39.4 | x | | |
| 8 | 309 | S | 41.5 | x | | |
| 9 | Incoloy 800 | N** | 40.6 | x | | |
| 10 | 430 | S | 40.1 | x | | |
| 11 | Incoloy 825 | N | 38.6 | | | x |
| 12 | Nitronic 60 | S | 39.1 | x | | |
| 13 | 304 L | S | 40.1 | x | | |
| 14 | 317 | S | 38.7 | | | x |
| 15 | Cronifer 1815 | S | 38.7 | | | x |
| 16 | 316 L | S | 38.6 | | | x |
| 17 | Inconel 600 | N | 36.3 | | x | |
| 18 | Lewmet 55 | N | 35.2 | | x | |
| 19 | Nitronic 50 | S | 40.8 | x | | |
| 20 | Lewmet 44 | N | 38.9 | | | x |
| 21 | Sanicro 28 | S | 40.5 | x | | |
| 22 | Carpenter 20 | S | 37.0 | | x | |
| 23 | 904 L | S | 37.6 | | x | |
| 24 | Inconel 625 | N | 34.5 | | x | |
| 25 | 254 SMO | S | 37.8 | | x | |
| 26 | Hastelloy G | N | 36.4 | | x | |
| 27 | Hastelloy C276 | N | 31.5 | | x | |
| 28 | Hastelloy B2 | N | 18.8 | | x | |

*Forced ranking based on suitability for Heat Recovery service.
+S = stainless steel/N = nickel base.
**Could be classified as stainless based on composition.

of the heat of absorption from 98% to 100% absorber acid at temperatures of greater than 120° C., in accordance with the process of the invention. In making such ranking, the corrosion data was compared for the various alloys at each of the three corners of the heat recovery tower operating diagram as shown in FIG. 4. Given the vicissitudes of startup and process upset conditions, the ranking also took into account the corrosion performance at temperatures and concentrations adjacent but somewhat outside the operating ranges. The ranking is set forth in Table 9, together with the corrosion index for each of the listed alloys as calculated from the corrosion index equation set forth hereinabove.

The dotted line on Table 9 divides the alloys considered to be most suitable for implementation of the process of the invention from those which would not currently be considered for commercial application, at least not for use in the tubes of the heat exchanger in which the heat of absorption is recovered by transfer from the absorption acid to another fluid. It should be understood that the corrosion rates for most of the alloys below the dotted line are reasonably satisfactory, and in fact lower than would have been expected prior to the corrosion testing program described in Examples 1 and 2. However, the alloys below the line are not currently considered commercial candidates because of the even more favorable corrosion performance of the alloys listed above the dotted line. It should further be noted that the ranking set forth in Table 9 is based entirely on corrosion data and does not necessarily reflect the exact current ranking when detailed economic or fabrication considerations are taken into account. However, regardless of whether the ranking incorporates design optimization considerations or is done strictly on the basis of corrosion results as in Table 9, the general correlation between a corrosion index greater than 39 and

EXAMPLE 3

A pilot heat recovery tower is installed ahead of the final absorption tower in a non-interpass sulfur burning sulfuric acid plant. A process gas slipstream of 5.0 Nm³/min at a temperature of 260° C. and containing 7.5 volume percent sulfur trioxide is fed to the heat recovery tower. Sulfuric acid with a concentration of 99.0 weight percent and a temperature of 162° C. is fed to the top of the heat recovery tower at a rate of 35 kg/min. The acid leaves the tower at a concentration of 99.9 weight percent and a temperature of 201° C. Overall absorption of sulfur trioxide from the feed gas stream is approximately 96%. Acid flows by gravity from the tower to a pump tank, from whence it is pumped to a boiler where 0.8 kg/min of steam is generated at a pressure of 450 kPa. Acid leaves the boiler at a temperature of 155° C. and is diluted to a 99.0 weight percent by in-line addition of liquid water. The heat of dilution increases the acid temperature to 162° C. This stream is then circulated to the top of the tower, completing the cycle.

EXAMPLE 4

As described in Example 3, a pilot plant heat recovery tower was installed ahead of the final absorption tower in a non-interpass sulfur-burning sulfuric acid plant. The pilot plant tower was 0.34 m I.D. and contained an absorption zone comprising No. 2 ceramic Intalox saddles with a packed height of 1.1 m. A process gas slipstream containing 7.8 volume percent sulfur trioxide at a temperature of 226° C. was fed to the bottom inlet of the heat recovery tower at a volumetric rate of 5.8 Nm³ per minute. Sulfuric acid having an average concentration of 98.9% and temperature of 161° C. was fed to the top inlet of the tower at a rate of 50 kg/min. At steady state, a sulfuric acid stream having an average concentration of 99.6% by weight and a temperature of 188° C. flowed outward through the bottom outlet of the tower. During passage through the heat recovery tower, approximately 95% of the sulfur trioxide content of the feed gas stream was absorbed into the sulfuric acid stream. Sulfuric acid leaving the tower flowed by gravity to a pump tank from whence it was pumped to a boiler where 1.1 kg/min of steam was generated at a pressure of 445 kPa. Acid left the boiler at a temperature of 154° C., 1.9 kg/min product acid was removed, and the remaining acid stream was thereafter diluted to 98.9 weight percent by inline addition of liquid water prior to recycle to the tower. The heat of dilution increased the acid temperature to 161° C. Corrosion probes of type 304L stainless steel were mounted in the acid line before the boiler. The corrosion rate of type 304L stainless steel was less than 0.03 mm per year.

EXAMPLE 5

Operation of the heat recovery process of the invention was continued in the pilot plant described in Example 4, the conditions being varied to demonstrate varying temperatures in the heat recovery tower and boiler.

The boiler used for cooling the absorber acid in the operation of the pilot plant was a vertical shell and tube heat exchanger having a shell constructed of 310 stainless steel. Various materials were used for the tubes of the exchanger. One tube had an O.D. of 25 mm and was constructed of type 310 stainless steel, while the remaining 22 tubes, all 19 mm O.D., were constructed of type 304L stainless steel (9 tubes), E-Brite alloy XM-27 (7 tubes), and Ferralium alloy 255 (6 tubes). During pilot plant operation, absorber acid having a strength of 99-100% was passed through the shell side and boiler feed water through the tube side of the exchanger. Steam was generated on the tube side and, during the two-month period of pilot plant operation, the acid temperature was varied as required to generate steam at various pressures. Thus, the acid temperature varied from 144° C. to 217° C. at the acid inlet on the bottom of the boiler and between 132° C. and 194° C. at the acid outlet at the top of the boiler. The highest steam pressure produced was 1140 kPa corresponding to 181° C. at saturation. Over the course of the pilot plant operation, measurements were made to determine the effect of the high temperature concentrated acid on the heat exchanger tubes. Additionally, corrosion coupons constituted of various metals were installed at various points throughout the acid recirculation system. Nine different metals were corrosion tested by means of coupons located under the acid distributor within the heat recovery tower, and in the pump tank. Pipe spools of type 304L and type 310 stainless steel were located in the acid line at points before and after the boiler and immediately downstream of the dilution sparger, i.e., the Teflon sparger through which water was introduced into a Teflon-lined pipe section in the recirculating system to adjust the acid strength in compensation for the sulfur trioxide absorbed. Additionally, various distributor parts of type 304L and type 310 stainless steel were tested, and a type 304L mesh pad was installed at the top of the tower.

After the pilot plant run was completed, the heat exchanger was removed and cut up for visual inspection and observation. An attempt was made to directly measure loss in tube diameter, but these measurements proved erratic and unreliable. However, visual observations at up to 40 magnifications of the outside of the surfaces of the tubes revealed:

310—uniform light etch
Ferralium 255—etch, few craters, probably at weld
E-Brite 26-1—uniformly dispersed craters
304L—uniform etch, indications of some intergranular attack Water-side observations also indicated that the various tube materials tested were satisfactory under the conditions prevailing. Tube sheet welds were found to be generally in satisfactory condition. There were numerous white deposits on the sufaces within the acid side of the exchanger. These were most often found on the tubes at the baffle areas, on the tops of the baffles and on the top of weld beads connecting the baffles to the positioning rods. A tube with such deposits on it was analyzed by X-ray fluorescence. Areas with and without deposits were compared. The only difference found was in sulfur content, thus indicating that the deposits were primarily sulfates.

Using the standard NACE test, the corrosion rate on the various corrosion coupons was determined. Comparable techniques were utilized to determine the corrosion rates on the pipe spools, distributors, and type 304L stainless steel mesh pad. The results of these corrosion measurements are set forth in Table 10.

TABLE 10

HEAT RECOVERY TOWER PILOT PLANT CORROSION TEST RESULTS

| MATERIAL | COUPONS UNDER DISTRIBUTOR (MPY) | COUPONS IN PUMP TANK (MPY) (T = 53 DAYS) | (T = 29 DAYS) |
|---|---|---|---|
| Ferralium 255 | 0.3 | 0.5 | 0.6 |
| 310 | 0.4 | 0.6 | 0.8 |
| 309 | 0.7 | 0.6 | 0.7 |
| E Brite 26-1 | 1.0 | 0.5 | 0.6 |
| Lewmet 66 | 0.6 | 1.8 | 1.9 |
| 304L | 1.7 | 1.9 | 2.3 |
| 316 | 4.8 | 5.8 | 7.4 |
| 317 | 15.7 | 5.0 | 6.2 |
| Incoloy 825 | 21. | 9 | 3.8 |

| MATERIAL | PIPE SPOOLS AFTER DILUTION SPARGER (MPY) | PIPE SPOOLS BEFORE BOILER (MPY) | PIPE SPOOLS AFTER BOILER (MPY) |
|---|---|---|---|
| 304L | 2.3 | 2.9 | 15.7 |
| 310 | 2.2 | 1.3 | 8.3 |

| MATERIAL | DISTRIBUTOR PIPE SPOOL CORROSION RATE (MPY) | |
|---|---|---|
| | (INNER AREA) | TOTAL AREA) |
| 304L | 4.3 | 1.7 |
| 304L | 5.6 | 2.2 |

TABLE 10-continued

HEAT RECOVERY TOWER PILOT PLANT CORROSION TEST RESULTS

| 310 | 2.6 | 1.1 |
| 310 | 2.1 | 0.8 |

304L MESH PAD CORROSION RATE = 0.1 MPY
(0.03 cm Wire, 2.97 m²)

Additional data on the corrosion rate of type 304L stainless steel was taken during the pilot plant run using an electrochemical device ("Corrater" sold by Rohrback Instruments, Division of Rohrback Corporation, 11861 E. Telegraph Rd., Santa Fe Springs, CA 90670) for measuring corrosion rate. This device was installed in the acid stream on the inlet end of the boiler. Conditions at the inlet side varied as the pilot plant run progressed, and there was also some variation in the corrosion rates measured with the "Corrater". Overall, however, the results were favorable. For operation at temperatures varying from 144° F. to 217° F. and acid concentrations varying from 99.2% to 100.9%, the Corrater indicated a mean corrosion rate of 0.03 mm/yr, with a standard deviation of 0.03 mm/yr.

EXAMPLE 6

A heat recovery tower is installed ahead of the interpass absorption tower in a sulfur burning sulfuric acid plant.

A process gas stream of 2914 Nm³ per min. at a temperature of 166° C. containing 11.8 volume percent sulfur trioxide is fed to the bottom of the heat recovery tower. Sulfuric acid having a concentration of 98.6% by weight and a temperature of 168° C. is fed to the top of the tower at a rate of 22670 kg per min.

The acid leaves the tower at a concentration of 99.8 weight percent and a temperature of 198° C. Overall absorption of sulfur trioxide from the feed gas stream is approximately 97%.

Acid leaving the tower flows by gravity to a pump tank, from whence it is pumped to a boiler where approximately 830 kg/min. of steam is generated at a pressure of 377 kPa.

Acid leaves the boiler at a temperature of 152° C. and, after product removal, is diluted to 98.6 weight percent by in-line addition of liquid water. The heat of dilution increases the acid temperature to 168° C. This stream is then recirculated to the top of the tower, completing the cycle.

EXAMPLE 7

A heat recovery tower is intalled ahead of the interpass absorption tower in an existing sulfur burning sulfuric acid plant.

A process gas stream of 2067 Nm³/min at a temperature of 232° C. containing 10.3 volume percent sulfur trioxide is fed to the bottom of the heat recovery tower. Sulfuric acid with a concentration of 99.1 weight percent and a temperature of 206° C. is fed to the top of the tower at a rate of 43157 kg/min.

The acid leaves the tower at a concentration of 99.5 weight percent and a temperature of 215° C. Overall absorption of sulfur trioxide from the feed gas stream is approximately 89%.

Acid leaving the tower flows by gravity to a pump tank; from whence it is pumped to a boiler where approximately 507 kg/min of steam is generated at a pressure of 1342 kPa.

Acid leaves the boiler at a temperature of 201° C. and, after product removal, is diluted to 99.1 weight percent by in-line addition of liquid water. The heat of dilution increases the acid temperature to 206° C. This stream is then recirculated to the top of the tower, completing the cycle.

EXAMPLE 8

A heat recovery tower is installed ahead of the final absorption tower in a non-interpass metallurgical sulfuric acid plant.

A process gas stream ofnstalled ahead of the final absorption tower in a non-interpass metallurgical sulfuric acid plant.

A process gas stream of 2470 Nm³/min at a temperature of 232° C. containing 9.8 volume percent sulfur trioxide is fed to the bottom of the heat recovery tower. Sulfuric acid with a concentration of 98.6 weight percent and a temperature of 162° C. is fed to the top of the tower at a rate of 16242 kg/min.

The acid leaves the tower at a concentration of 99.8 weight percent and a temperature of 206° C. Overall absorption of sulfur trioxide from the feed gas stream is approximately 97%.

Acid leaving the tower flows by gravity to a pump tank where it is diluted to 99.3 weight percent. Dilution is accomplished by addition of 1375 kg/min. of 66° C., 93.0 weight percent acid.

After dilution in the pump tank the resulting acid enters a boiler at 196° C. where approximately 641 kg/min. of steam is generated at a pressure of 377 kPa.

Acid leaves the boiler at a temperature of 153° C. and, after product removal, is diluted to 98.6 weight percent by in-line addition of 112 kg/mm of 141° C. water containing 1.2% steam. The heat of dilution inceases the acid temperature to 162° C. This stream is then recirculated to the top of the tower, completing the cycle.

Example 9

A heat recovery tower is installed ahead of the interpass absorption tower in an existing sulfur burning sulfuric acid plant.

A process gas stream of 2542 Nm³/min. at a temperature of 154° C. containing 11.8 volume percent sulfur trioxide is fed to the bottom of the heat recovery tower. Sulfuric acid with a concentration of 98.6 weight percent and a temperature of 168° C. is fed to the top of the tower at a rate of 19871 kg/min.

The acid leaves the tower at a concentration of 99.8 weight percent and a temperature of 197° C. Overall absorption of sulfur trioxide from the feed gas stream is approximately 97%.

Acid leaving the tower flows by gravity to a pump tank, from whence it is pumped to a boiler where approximately 691 kg/min. of steam is generated at a pressure of 377 kPa.

Acid leaves the boiler at a temperature of 152° C. and, after product removal is diluted to 98.6 weight percent by in-line additon of liquid water. The heat of dilution increases the acid temperature to 168° C. This stream is then recirculated to the top of the tower, completing the cycle.

EXAMPLE 10

A heat recovery tower is installed ahead of the interpass absorption tower in a sulfur burning sulfuric acid plant.

A process gas stream of 2969 Nm$^3$/min at a temperature of 162° C. containing 11.6 volume percent sulfur trioxide is fed to the bottom of the heat recovery tower. Sulfuric acid with a concentration of 98.8 weight percent and a temperature of 206° C. is fed to the top of the tower at a rate of 29293 kg/min.

The acid leaves the tower at a concentration of 99.7 weight percent and a temperature of 222° C. Overall absorption of sulfur trioxide from the feed gas stream is approximately 90%.

Acid leaving the tower flows by gravity to a pump tank, from whence it is pumped to a boiler where approximately 710 kg/min. of steam is generated at a pressure of 1136 kPa.

Acid leaves the boiler at a temperature of 194° C. and, after product removal, is diluted to 98.8 weight percent by in-line addition of liquid water. The heat of dilution increases the acid temperature to 206° C. This stream is then recirculated to the top of the tower, completing the cycle.

What is claimed is:

1. In a commercial process for the manufacture of sulfuric acid, comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery absorption zone to which said sulfuric acid is delivered at a concentration of at least 98% and a temperature of at least 120° C., and from which said sulfuric acid is discharged at a concentration of at least 99% and a temperature greater than 120° C.; and removing said heat of absorption from said sulfuric acid in useful form by transfer of heat to another fluid in said heat exchanger, and thereby heating said another fluid to a temperature greater than 120° C., said sulfuric acid having a temperature greater than 120° C. and a concentration of at least 99% throughout the course of transfer of heat to said another fluid, said heat exchanger comprising means for transfer of heat from said sulfuric acid to said another fluid, the nature of the material of said heat transfer means and the corrosion rate thereof under the aforesaid conditions being such as to permit sustained operation of said process for the commercial production of sulfuric acid and recovery of energy, said material comprising an alloy of an iron group metal and having a corrosion rate of not greater than about 0.16 mm per year in 99% sulfuric acid at 143° C.

2. An improved process as set forth in claim 1 wherein said sulfuric acid leaves said zone in a stream having a temperature greater than 120° C., said sulfuric acid stream is passed through said heat exchanger, and at least a portion of the cooled acid stream is recycled to said heat recovery zone.

3. An improved process as set forth in claim 2 wherein said sulfuric acid is diluted during recirculation to a strength greater than 98% and up to about 99.3%.

4. An improved process as set forth in claim 2 wherein dilution is effected by adding a diluent selected from a group consisting of liquid water, steam, and relatively dilute sulfuric acid to said circulating stream after heat transfer to said another fluid and before entry of said acid into said zone.

5. An improved process as set forth in claim 1 wherein said heat transfer means comprises means for indirect transfer of heat from said sulfuric acid to said another fluid.

6. An improved process as set forth in claim 1 wherein said sulfuric acid has a temperature greater than 120° C. and less than about 250° C. as it exits said zone.

7. In a commercial process for the manufacture of sulfuric acid, comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery absorption zone to which said sulfuric acid is delivered at a concentration of at least 98% and a temperature of at least 120° C., and from which said sulfuric acid is discharged at a concentration of at least 99% and a temperature greater than 120° C.; and removing said heat of absorption from said sulfuric acid in useful form by transfer of heat to another fluid in said heat exchanger, thereby heating said another fluid to a temperature greater than 120° C., said sulfuric acid having a temperature greater than 120° C. and a concentration of at least 99% throughout the course of heat transfer to said another fluid, said another fluid as introduced into said heat exchanger comprising a liquid, and transfer of heat to said another fluid resulting in vaporization of said another fluid so that said another fluid comprises a vapor as it exits said exchanger, said heat exchanger comprising means for transfer of heat from said sulfuric acid to said another fluid, the nature of the material of said heat transfer means and the corrosion rate thereof under the aforesaid conditions being such as to permit sustained operation of said process for the commercial production of sulfuric acid and recovery of energy, said material comprising an alloy of an iron group metal and having a corrosion rate of not greater than about 0.16 mm per year in 99% sulfuric acid at 143° C.

8. An improved process as set forth in claim 7 wherein said another fluid consists essentially of a vapor as it exits said exchanger.

9. An improved process as set forth in claim 8 wherein said another fluid comprises water, and steam is generated in said heat exchanger.

10. An improved process as set forth in claim 7 wherein said heat exchanger comprises means for indirect transfer of heat from said sulfuric acid to said another fluid.

11. An improved process as set forth in claim 7 wherein a stream of sulfuric acid and a stream of gas comprising sulfur trioxide are passed countercurrently through said zone.

12. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:
   contacting a gas comprising sulfur trioxide with sulfuric acid having a concentration between 98% and 101%, thereby absorbing sulfur trioxide in the sulfuric acid and generating the heat of absorption, the absorption being carried out in a heat recovery absorption zone to which said sulfuric acid is delivered at a concentration of at least 98% and a temperature of at least 120° C., and from which said sulfuric acid is discharged at a concentration of at least 99% and a temperature greater than 120° C; and
   removing the heat of absorption from said sulfuric acid in useful form through transfer of heat to another fluid in said heat exchanger and thereby heating said another fluid to a temperature greater than 120° C., said heat exchanger comprising means for transfer of heat from said sulfuric acid to another fluid, said means comprising an alloy selected from the group consisting of ferrous alloys containing chromium, iron-nickel alloys containing chromium, and nickel base alloys containing chromium, said alloy having a ferritic, austenitic or duplex structure, the composition of said alloy further satisfying ning chromium, said alloy having a ferritic, austenitic or duplex structure, the composition of said alloy further satisfying the following relationship:

$$0.35(Fe+Mn)+0.70(Cr)+0.30(Ni)-0.12(Mo)>39$$

where:
   Fe = the weight percent of iron in the alloy,
   Mn = the weight percent of manganese in the alloy,
   Cr = the weight percent of chromium in the alloy,
   Ni = the weight percent of nickel in the alloy, and
   Mo = the weight percent of molybdenum in the alloy.

13. An improved process as set forth in claim 12 wherein said heat transfer means comprises means for indirect transfer of heat from said sulfuric acid to said another fluid.

14. An improved process as set forth in claim 12 wherein the gas leaving said heat recovery absorption zone is contacted with sulfuric acid in another absorption zone, thereby effecting further absorption of sulfur trioxide and condensation of sulfuric acid vapor contained in said gas.

15. An improved process as set forth in claim 12 wherein said sulfuric acid and said gas are passed countercurrently through said zone.

16. An improved process as set forth in claim 12 wherein said alloy is a ferrous or iron-nickel alloy containing between about 16% and about 30% by weight chromium, up to about 33% by weight nickel, up to about 6% by weight molybdenum, and between about 35% and about 83% by weight iron.

17. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:
   contacting a gas comprising sulfur trioxide with sulfuric acid having a concentration between 98% and 101%, thereby absorbing sulfur trioxide in the sulfuric acid and generating the heat of absorption, the absorption being carried out in a heat recovery zone to which sulfuric acid is delivered at a concentration of at least 98% and a temperature of at least 120° C., and from which sulfuric acid is discharged at a concentration of at least 99% and a temperature greater than 120° C.;
   removing the heat of absorption from said sulfuric acid in useful form through transfer of heat to another fluid in said heat exchanger and thereby heating said another fluid to a temperature greater than 120° C; and
   contacting the exit gas from said heat recovery zone with sulfuric acid in another absorption zone for removal of residual sulfur trioxide and condensation of sulfuric acid vapor from said exit gas before either exhausting said exit gas from the process or catalytically oxidizing sulfur dioxide contained therein to produce additional sulfur trioxide, the temperature of the sulfuric acid at the gas exit from said another absorption zone being at least about 10° C. lower than the temperature of the sulfuric acid at the inlet of said heat recovery zone.

18. In a process for the manufacture of sulfuric acid comprising the catalytic oxidation of sulfur dioxide to sulfur trioxide, absorption of the sulfur trioxide in sulfuric acid and cooling the sulfuric acid in a heat exchanger by transfer of heat to another fluid, the improvement which comprises:
   contacting a gas comprising sulfur trioxide with sulfuric acid, said sulfuric acid having a concentration between 98% and 101% and a temperature greater than 125° C., thereby absorbing sulfur trioxide in the sulfuric acid and generating the heat of absorption, the absorption being carried out in a heat recovery absorption zone to which said sulfuric acid is delivered at a concentration of at least 98% and a temperature of at least 125° C., and from which said sulfuric acid is discharged at a concentration of at least 99% and a temperature greater than 125° C.; and
   removing said heat of absorption from said sulfuric acid in useful form through heat exchange with another fluid in said heat exchanger, and thereby heating said another fluid to a temperature greater than 125° C., said sulfuric acid having a temperature greater than 125° C. and a concentration of at least 99% throughout the course of heat transfer to said another fluid,
   said heat exchanger comprising means for transfer of heat from said sulfuric acid to said another fluid, the nature of the material of said heat transfer means and the corrosion rate thereof under the aforesaid conditions being such as to permit sustained operation of said process for the commercial production of sulfuric acid and recovery of energy, said material comprising an alloy of an iron group metal and having a corrosion rate of not greater than about 0.16 mm per year in 99% sulfuric acid at 143° C.

19. An improved process as set forth in claim 18 wherein sulfur trioxide is absorbed into sulfuric acid in a heat recovery tower, said sulfuric acid leaves the heat recovery tower in a stream having a temperature greater than 125° C., said sulfuric acid stream is passed through a heat exchanger in which heat is transferred from said sulfuric acid to said another fluid, and said sulfuric acid is circulated between said heat recovery tower and said heat exchanger.

20. A method as set forth in claim 19 wherein the concentration of said circulating stream is maintained at greater than 98.5% and less than 101% throughout said heat recovery tower.

21. An improved process as set forth in claim 19 wherein said sulfuric acid is diluted during circulation to a concentration greater than 98% and up to about 99.3%.

22. An improved process as set forth in claim 21 wherein dilution is effected by adding a diluent selected from the group consisting of liquid water, steam, and relatively dilute sulfuric acid to said circulating stream after heat transfer to said another fluid and before entry into said heat recovery tower.

23. An improved process as set forth in claim 19 wherein the concentration of said circulating stream is maintained at greater than 99% and less than 101% throughout said heat exchanger.

24. An improved process as set forth in claim 19 wherein said another fluid as introduced into said heat exchanger comprises a liquid and transfer of heat to said another fluid results in vaporization of said another fluid so that siad another fluid comprises a vapor as it exits said exchanger.

25. A method as set forth in claim 19 wherein said acid stream and said sulfur trioxide are passed countercurrently through said tower.

26. An improved process as set forth in claim 19 wherein the acid stream and sulfuric acid are passed cocurrently through the tower.

27. An improved process as set forth in claim 19 wherein said sulfuric acid has a temperature greater than 125° C. and less than about 250° C. as it exits said heat recovery tower.

28. An improved process as set forth in claim 18 wherein said another fluid is heated to a temperature greater than about 125° C.

29. An improved process as set forth in claim 28 wherein said sulfuric acid is maintained at a temperature greater than about 130° C. throughout the course of heat transfer to said another fluid and said another fluid is heated to a temperature greater than about 130° C.

30. An improved process as set forth in claim 29 wherein said sulfuric acid is maintained at a temperature greater than about 135° C. throughout the course of heat transfer to said another fluid and said another fluid is heated to a temperature greater than about 135° C.

31. An improved process as set forth in claim 29 wherein said sulfuric acid is maintained at a temperature greater than about 140° C. throughout the course of heat transfer to said another fluid and said another fluid is heated to a temperature greater than about 140° C.

32. An improved process as set forth in claim 31 wherein said sulfuric acid is maintained at a temperature greater than about 150° C. throughout the course of heat transfer to said another fluid and said another fluid is heated to a temperature greater than about 150° C.

33. An improved process as set forth in claim 32 wherein said sulfuric acid is maintained at a temperature greater than about 175° C. throughout the course of heat transfer to said another fluid and said another fluid is heated to a temperature greater than about 175° C.

34. An improved process as set forth in claim 33 wherein said sulfuric acid is maintained at a temperature greater than about 200° C. throughout the course of heat transfer to said another fluid and said another fluid is heated to a temperature greater than about 200° C.

35. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:
contacting a gas comprising sulfur trioxide with sulfuric acid having a concentration between 98% and 101%, thereby absorbing sulfur trioxide in the sulfuric acid and generating the heat of absorption, the absorption being carried out in a heat recovery zone to which said sulfuric acid is delivered at a concentration of at least 98% and a temperature of at least 120° C., and from which said sulfuric acid is discharged at a concentration of at least 99% and a temperature greater than 120° C.; and removing the heat of absorption from said sulfuric acid in useful form through transfer of heat to another fluid in said heat exchanger and thereby heating said another fluid to a temperature greater than 120° C., the temperature of said sulfuric acid being greater than 120° C. and the concentration of said sulfuric acid being at least 99% throughout its passage through said heat exchanger, said heat exchanger comprising means for transfer of heat from said sulfuric acid to another fluid, said means comprising an alloy selected from the group consisting of ferrous alloys containing chromium, iron/nickel alloys containing chromium, and nickel-base alloys containing chromium, said alloy having a corrosion rate not greater than about 0.16 mm per year in 99% sulfuric acid at 143° C.

36. An improved process as set forth in claim 35 wherein said alloy is a ferrous or an iron/nickel alloy containing between about 16% and 30% by weight chromium, up to about 33% by weight nickel, up to about 6% by weight molybdenum, and between about 35% and 83% by weight iron.

37. An improved process as set forth in claim 35 wherein said alloy is a nickel alloy containing between about 32% and 76% by weight nickel, between 1% and 31% by weight chromium, between about 2% and 46% by weight iron, and up to about 28% molybdenum.

38. An improved process as set forth in claim 35 wherein said alloy is a nickel alloy containing between 37% and 43% by weight nickel, between 23% and 31% by weight chromium, between about 16% and about 28% iron, and up to about 3% by weight molybdenum.

39. An improved process as set forth in claim 35 wherein said alloy is a nickel alloy containing between about 37% and about 43% by weight nickel, between about 23% and 31% by weight chromium, between about 16% and 28% by weight iron, and up to about 3% by weight molybdenum.

40. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery zone to which sulfuric acid is delivered at a concentration of at least 98% and a temperature of at least 120° C., and from which sulfuric acid is discharged at a concentration of at least 99% and a temperature greater than 120° C.;

removing the heat of absorption from said sulfuric acid in useful form through transfer of heat to another fluid in said heat exchanger and thereby heating said another fluid to a temperature greater than 120° C., said sulfuric acid having a temperature greater than 120° C. and a concentration of at least 99% throughout the course of heat transfer to said another fluid; and contacting the exit gas from said heat recovery zone with sulfuric acid in another absorption zone for removal of residual sulfur trioxide from said exit gas before either exhausting said exit gas from the process or catalytically oxidizing sulfur dioxide contained therein to produce additional sulfur trioxide, the temperature of the sulfuric acid throughout said another absorption zone being lower than the temperature of the sulfuric acid at the inlet of said heat recovery zone.

41. In a process for the manufacture of sulfuric acid comprising passing a gas stream comprising sulfur dioxide and oxygen through a series of catalyst stages and catalytically oxidizing sulfur dioxide to sulfur trioxide in said catalyst stages, the improvement which comprises:

passing an interpass gas stream comprising sulfur trioxide through a heat recovery zone, said interpass gas stream comprising gas exiting from a catalyst stage upstream of the final catalyst stage;

contacting said interpass gas stream in said heat recovery zone with sulfuric acid having a concentration between 98% and 101%, thereby absorbing sulfur trioxide in said sulfuric acid and generating the heat of absorption, said sulfuric acid entering said heat recovery zone at a concentration of at least 98% and a temperature of at least 120° C., and exiting said heat recovery zone at a concentration of at least 99% and a temperature of at least 120° C.;

removing the heat of absorption from said sulfuric acid in useful form through transfer of heat to another fluid in a heat exchanger, thereby heating said another fluid to a temperature greater than 120° C.; and contacting the exit gas from said heat recovery zone with sulfuric acid in another absorption zone for removal of residual sulfur trioxide from said exit gas before catalytically oxidizing sulfur dioxide contained in said exit gas to produce additional sulfur trioxide.

42. An improved process as set forth in claim 41 wherein said another absorption zone is operated with an acid inlet temperature lower than 120° C.

43. In a process for the manufacture of sulfuric acid comprising passing a gas stream comprising sulfur dioxide and oxygen through a series of catalyst stages and catalytically oxidizing sulfur dioxide to sulfur trioxide in said catalyst stages, the improvement which comprises;

passing a final reaction gas stream comprising sulfur trioxide through a heat recovery zone, said final reaction gas stream comprising gas exiting from the final stage of said series of catalyst stages;

contacting said final reaction gas stream in said heat recovery zone with sulfuric acid having a concentration between 98% and 101%, thereby absorbing sulfur trioxide in said sulfuric acid and generating the heat of absorption, said sulfuric acid entering said heat recovery zone at a concentration of at least 98% and a temperature of at least 120° C., and exiting said heat recovery zone at a concentration of at least 99% and a temperature of at least 120° C.;

removing the heat of absorption from said sulfuric acid in useful form by transfer of heat to another fluid in a heat exchanger, thereby heating said another fluid to a temperature greater than 120° C.; and contacting the exit gas from said heat recovery zone with sulfuric acid in another absorption zone for removal of residual sulfur trioxide from said exit gas before exhausting said exit gas from the process, said another absorption zone being operated with an inlet acid temperature of approximately 80° C. or below.

44. An improved process as set forth in claim 43 wherein said final reaction gas stream and and sulfuric acid are passed countercurrently through said heat recovery zone.

45. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises;

contacting a gas comprising sulfur trioxide with sulfuric acid having a concentration between 98% and 101%, thereby absorbing sulfur trioxide in the sulfuric acid and generating the heat of absorption, the absorption being carried out in a heat recovery zone to which sulfuric acid is delivered at a concentration of at least 98% and a temperature of at least 120° C., and from which acid is discharged at a concentration of at least 99% and a temperature greater than 120° C.;

removing the heat of absorption from said sulfuric acid in useful form through transfer of heat to another fluid in said heat exchanger and thereby heating said another fluid to a temperature greater than 120° C.; and contacting the exit gas from said heat recovery zone with sulfuric acid in another absorption zone for removal of residual sulfur trioxide from said exit gas before either exhausting said exit gas from said process or catalytically oxidizing sulfur dioxide-contained therein to produce additional sulfur trioxide, said another absorption zone being operated with an exit sulfuric acid temperature lower than 120° C.

46. An improved process as set forth in claim 45 wherein said gas comprising sulfur trioxide and said sulfuric acid are passed countercurrently through said heat recovery zone.

47. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration between 98% and 101%, thereby absorbing sulfur trioxide in the sulfuric acid and generating the heat of absorption, the absorption being carried out in a heat recovery zone to which sulfuric acid is delivered at a concentration of at least 98% and a temperature of least 120° C. and from which sulfuric acid is discharged at a concentration of at least 99% and a temperature greater than 120° C.;

removing the heat of absorption from said sulfuric acid in useful form through transfer of heat to another fluid in said heat exchanger and thereby heating said another fluid to a temperature greater than 120° C., said sulfuric acid having a temperature greater than 120° C. and a concentration of at least 99% throughout the course of heat transfer to said another fluid; and contacting the exit gas from said heat recovery zone with sulfuric acid in another absorption zone for removal of residual sulfur trioxide from said exit gas before either exhausting said gas from the process or catalytically oxidizing sulfur dioxide contained therein to produce additional sulfur trioxide, the temperature of the sulfuric acid at the inlet of said another absorption zone being at least 40° C. lower than the inlet temperature of the sulfuric acid to the heat recovery zone.

48. In a process for the manufacture of sulfuric acid comprising the catalytic oxidation or sulfur dioxide to sulfur trioxide, absorption of the sulfur trioxide in sulfuric acid, and cooling the sulfuric acid in a heat exchanger by transfer of heat to another fluid, the improvement which comprises;

contacting a gas comprising sulfur trioxide with sulfuric acid having a concentration between 98% and 101%, thereby absorbing sulfur trioxide in the sulfuric acid and generating the heat of absorption, the absorption being carried out in a heat recovery zone to which said sulfuric acid is delivered at concentration of at least 98% and a temperature of at least 120° C., and from which said sulfuric acid is discharged at a concentration of at least 99% and a temperature of greater than 120° C.;

removing said heat of absorption from said sulfuric acid in useful form by transfer of heat to another fluid in said heat exchanger, thereby heating said another fluid to a temperature of greater than 120° C., said sulfuric acid having a temperature greater than 120° C. and a concentration of at least 99% throughout the course of heat transfer to said another fluid, said another fluid as introduced into said heat exchanger comprising a liquid, and transfer of heat to said another fluid resulting in vaporization of said another fluid so that said another fluid comprises a vapor as it exits said exchanger; and contacting the exit gas from said heat recovery zone with sulfuric acid in another absorption zone for removal of residual sulfur trioxide from said exit gas before either exhausting said exit gas from said process or catalytically oxidizing sulfur dioxide contained therein to produce additional sulfur trioxide.

49. In a process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration between 98% and 101%, thereby absorbing sulfur trioxide in the sulfuric acid and generating the heat of absorption, the absorption being carried out in a heat recovery absorption zone to which said sulfuric acid is delivered at a concentration of at least 98% and a temperature of at least 120? C., and from which said sulfuric acid is discharged at a concentration of at least 99% and a temperature greater than 120° C.; and removing the heat of absorption from said sulfuric acid in useful form through transfer of heat to another fluid in said heat exchanger and thereby heating said another fluid to a temperature greater than 120? C., said heat exchanger comprising means for transfer of heat from said sulfuric acid to another fluid, said means being constituted of an alloy selected from the group consisting of Alloy 26-1, designation), Alloy 255 (UNS designation S32550), 29-4-2, type 310 stainless steel, type 329 stainless steel, type 309 stainless steel, type 430 stainless steel, and type 304 stainless steel.

50. An improved process as set forth in claim 49 wherein said alloy comprises type 310 stainless steel.

51. In a commercial process for the manufacture of sulfuric acid, comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery absorption zone to which said sulfuric acid is delivered at a concentration of at least 98% and a temperature of at least 120° C., and from which said sulfuric acid is discharged at a concentration of at least 99.2% and a temperature greater than 120° C.; and removing said heat of absorption from said sulfuric acid in useful form by transfer of heat to another fluid in said heat exchanger, and thereby heating said another fluid to a temperature greater than 120° C., said sulfuric acid having a temperature greater than 120° C. and a concentration of at least 99.2% throughout the course of transfer of heat to said another fluid, said heat exchanger comprising means for transfer of heat from said sulfuric acid to said another fluid, the nature of the material of said heat transfer means and the corrosion rate thereof under the aforesaid conditions being such as to permit sustained operation of said process for the commercial production of sulfuric acid and recovery of energy, said material comprising an alloy of an iron group metal and having a corrosion rate of not greater than about 0.16 mm per year in 99% sulfuric acid at 143° C.

52. In a commercial process for the manufacture of sulfuric acid comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery absorption zone to which said sulfuric acid is delivered at a concentration of at least 98% and a temperature of at least 140° C., and from which said sulfuric acid is discharged at a concentration of at least 99% and a temerature greater than 140° C.; and removing said heat of absorption from said sulfuric acid in useful form by transfer of heat to another fluid in said heat exchanger, and thereby heating said another fluid to a temperature greater than 140° C., said sulfuric acid having a temperature greater than 140° C. and a concentration of at least 99% throughout the course of transfer of heat to said another fluid, said heat exchanger comprising means for transfer of heat from said sulfuric acid to said another fluid, the nature of the material of said heat transfer means and the corrosion rate thereof under the aforesaid conditions being such as to permit sustained operation of said process for the commercial production of sulfuric acid and recovery of energy, said material comprising an alloy of an iron group metal and having a corrosion rate of not greater than about 0.16 mm per year in 99% sulfuric acid at 143° C.

53. In a commercial process for the manufacture of sulfuric acid, comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery absorption zone to which said sulfuric acid is delivered at a concentration of at least 98% and a temperature of at least 120° C., and from which said sulfuric acid is discharged at a concentration of at least 99% and a temperature greater than 120° C.;

removing said heat of absorption from said sulfuric acid in useful form by transfer of heat to another fluid in said heat exchanger, and thereby heating said another fluid to a temperature greater than 120° C., said sulfuric acid having a temperature greater than 120° C. and a concentration of at least 99% throughout the course of transfer of heat to said another fluid;

recycling at least a portion of the cooled sulfuric acid stream to said absorption zone; and after passage of the circulating sulfuric stream through said heat exchanger, adding a diluent to said circulating stream to reduce its strength for further absorption of sulfur trioxide, said heat exchanger comprising means for transfer of heat from said sulfuric acid to said another fluid, the nature of the material of said heat transfer means and the corrosion rate thereof under the aforesaid conditions being such as to permit sustained operation of said process for the commercial production of sulfuric acid and recovery of energy, said material comprising an alloy of an iron group metal and having a corrosion rate of not greater than 0.16 mm per year in 99% sulfuric acid at 143° C.

54. In a process for the manufacture of sulfuric acid, comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery tower to which said sulfuric acid is delivered at a concentration of at least 98% and a temperature of at least 120° C., and from which said sulfuric acid is delivered at a concentration of at least 99% and a temperature greater than 120° C., said heat recovery tower being constructed of an alloy selected from the group consisting of ferrous alloys containing chromium, iron-nickel alloys containing chromium and nickel base alloys containing chromium, said alloy having a ferritic, austenitic or austenitic-ferritic duplex structure, the composition of said alloy further satisfying the following relationship:

$$0.35(Fe+Mn)+0.70(Cr)+0.30(Ni)-0.12(Mo) \; 39$$

where
Fe=the weight percent of iron in the alloy,
Mn=the weight percent of manganese in the alloy,
Cr=the wieght percent of chromium in the alloy,
Ni=the weight percent of nickel in the alloy,
Mo=the weight percent of molybdenum in the alloy; and removing said heat of absorption from said sulfuric acid in useful form by transfer of heat to another fluid in said heat exchanger, and thereby heating said another fluid to a temperature greater than 120° C., said heat exchanger comprising means for transfer of heat from said sulfuric acid to another fluid, said means comprising an alloy selected from the group consisting of ferrous alloys containing chromium, iron-nickel alloys containing chromium and nickel base alloys containing chromium, the alloy of said heat transfer means having a ferritic, austenitic or austenitic-ferritic duplex structure, the composition of the alloy of said heat transfer means further satisfying said relationship.

55. In a commercial process for the manufacture of sulfuric acid, comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101% thereby absorbing sulfur trioxide in the sulfuric acid and generating the heat of absorption, the absorption being carried out in a heat recovery absorption zone to which said sulfuric acid is delivered at a concentration of at least 98% and a temperature of at least 120° C., and from which said sulfuric acid is discharged at a concentration of at least 99% and a temperature greater than 120° C.; and removing said heat of absorption from said sulfuric acid in useful form by transfer of heat to another fluid in said heat exchanger, thereby heating said another fluid to a temperature greater than 120° C., said sulfuric acid having a temperature greater than 120° C. and a concentration of at least 99% throughout the course of heat transfer to said another fluid, said another fluid as introduced into said heat exchanger comprising a liquid, and transfer of heat to said another fluid resulting in vaporization of said another fluid so that said another fluid comprises a vapor as it exits said exchanger, said heat exchanger comprising means for transfer of heat from said sulfuric acid to said another fluid, said means being constituted of an alloy selected from the group consisting of ferrous alloys containing chromium, iron-nickel alloys containing chromium, and nickel alloys containing chromium, said alloy having a ferritic, austenitic or duplex structure, and the composition of said alloy further satisfying the following relationship:

$$0.35(Fe+Mn)+0.70(Cr)+0.30(Ni)-0.12(Mo)>39$$

where:
Fe=the weight percent of iron in the alloy,
Mn=the weight percent of manganese in the alloy,
Cr=the weight percent of chromium in the alloy,
Ni=the weight percent of nickel in the alloy, and
Mo=the weight percent of molybdenum in the alloy,
operation in accordance with the aforesaid conditions being carried out on a sustained basis for the commercial production of sulfuric acid and recovery of energy.

56. In a commercial process for the manufacture of sulfuric acid, comprising the catalytic oxidation of sulfur dioxide to sulfur trioxide, absorption of the sulfur trioxide in sulfuric acid, and cooling the sulfuric acid in a heat exchanger by transfer of heat to another fluid, the improvement which comprises:

contacting a gas comprising sulfur trioxide with sulfuric acid having a concentration of between 98% and 101%, thereby absorbing sulfur trioxide in the sulfuric acid and generating the heat of absorption, the absorption being carried out in a heat recovery absorption zone to which said sulfuric acid is delivered at a concentration of at least 98% and a temperature of at least 120° C., and from which said sulfuric acid is discharged at a concentration of at least 99% and a temperature greater than 120° C.;

removing said heat of absorption from said sulfuric acid in useful form by transfer of heat to another fluid in said heat exchanger, thereby heating said another fluid to a temperature greater than 120° C., said sulfuric acid having a temperature greater than 120° C. and a concentration of at least 99% throughout the course of heat transfer to said another fluid, said another fluid as introduced into said heat exchanger comprising a liquid, and transfer of heat to said another fluid resulting in vaporization of said another fluid so that said another fluid comprises a vapor as it exits said exchanger; and passing the gas exiting from said heat recovery absorption zone through another absorption zone and contacting said gas with sulfuric acid in said another absorption zone for further absorption of sulfur trioxide and condensation of sulfuric acid vapor contained in said gas, operation in accordance with the aforesaid conditions being carried out on a sustained basis for the commercial production of sulfuric acid and recovery of energy.

57. In a process for the manufacture of sulfuric acid, comprising the catalytic oxidation of sulfur dioxide to sulfur trioxide, absorption of the sulfur trioxide in sulfuric acid and cooling the sulfuric acid in a heat exchanger by transfer of heat to another fluid, the improvement which comprises:

contacting a gas comprising sulfur trioxide with sulfuric acid, said sulfuric acid having a concentration between 98% and 101% and a temperature greater than 125° C., thereby absorbing sulfur trioxide in the sulfuric acid and generating the heat of absorption, the absorption being carried out in a heat recovery absorption tower to which said sulfuric acid is delivered at a concentration of at least 98% and a temperature of at least 125° C., and from which said sulfuric acid is discharged at a concentration of at least 99% and a temperature greater than 125° C.; and removing said heat of absorption from said sulfuric acid in useful form through heat exchange with another fluid in said heat exchanger, and thereby heating said another fluid to a temperature greater than 125° C., said sulfuric acid having a temperature greater than 125° C. and a concentration of at least 99% throughout the course of heat transfer to said another fluid, said heat exchanger comprising means for the transfer of heat between said acid and said another fluid, said heat transfer means being constituted of an alloy selected from from the group consisting of ferrous alloys containing chromium, iron nickel alloys containing chromium and nickel alloys containing chromium, said alloy having an austenitic, ferritic or austenitic-ferritic duplex structure; and circulating said sulfuric acid between said heat recovery tower and said heat exchanger, operation in accordance with the aforesaid conditions being carried out on a sustained basis for the commercial production of sulfuric acid and recovery of energy.

58. In a process for the manufacture of sulfuric acid comprising the catalytic oxidation of sulfur dioxide to sulfur trioxide, absorption of the sulfur trioxide in sulfuric acid and cooling the sulfuric acid in a heat exchanger by transfer of heat to another fluid, the improvement which comprises:

contacting a gas comprising sulfur trioxide with sulfuric acid, said sulfuric acid having a concentration between 98% and 101% and a temperature greater than 125° C., thereby absorbing sulfur trioxide in the sulfuric acid and generating the heat of absorption, the absorption being carried out in a heat recovery absorption tower to which said sulfuric acid is delivered at a concentration of at least 98% and a temperature of at least 125° C., and from which sulfuric acid is discharged at a concentration of at least 99% and a temperature greater than 125° C.;

removing said heat of absorption from said sulfuric acid in useful form through heat exchange with another fluid in said heat exchanger, and thereby heating said another fluid to a temperature greater than 125° C., said sulfuric acid having a temperature greater than 125° C. and a concentration of at least 99% throughout the course of heat transfer to said another fluid;

circulating said sulfuric acid between said heat recovery tower and said heat exchanger; and passing the gas exiting from said heat recovery tower through another sulfuric acid absorption zone for removal of sulfur trioxide and condensation of sulfuric acid vapor from said gas stream, said another absorption zone being operated with an inlet sulfuric acid temperature lower than 125° C., operation in accordance with the aforesaid conditions being carried out and a sustained basis for the commercial production of sulfuric acid and recovery of energy.

59. An improved process as set forth in claim 58 wherein said another absorption tower comprises an interpass tower and the gas stream exiting said another tower contains sulfur dioxide and is delivered to a catalytic converter stage for oxidation of sulfur dioxide to sulfur trioxide.

60. A method for storage, transportation, or handling of sulfuric acid having a concentration between 98% and 101% and a temperature above 120° C. comprising containing said sulfuric acid within a conduit or vessel constituted of an alloy selected from the group from the group consisting of ferrous alloys containing chromium, iron-nickel alloys containing chromium, and nickel alloys chromium, said alloy having an austenitic, ferritic, or duplex structure, the composition of said alloy further corresponding to the relationship:

$$0.35(Fe+Mn)+0.70(Cr)+0.30(Ni)-0.12(Mo)>39$$

where
Fe = the weight percent iron in the alloy,
Mn = the weight percent manganese in the alloy,
Cr = the weight percent chromium in the alloy,
Ni = the weight percent nickel in the alloy, and
Mo = the weight percent molybdenum in the alloy.

61. A method for condensing sulfuric acid vapor from a gas stream saturated with sulfuric acid vapor at a temperature greater than 120° C., comprising bringing said gas stream into contact with a heat transfer surface having a temperature lower than the saturation temperature of said gas stream with respect to sulfuric acid vapor but greater than 120° C. and high enough so that the sulfuric acid condensing on said surface has a concentration greater than 98.5%, said heat transfer surface being comprised of an alloy selected from the group consisting of ferrous alloys containing chromium, iron-nickel alloys containing chromium, and nickel alloys containing chromium, said alloy having an austenitic, ferritic, or duplex structure, the composition of said alloy further corresponding to the relationship:

$$0.35(Fe+Mn)+0.70(Cr)+0.30(Ni)-0.12(Mo)>39$$

where:
Fe = the weight percent of iron in the alloy,
Mn = the weight percent of manganese in the alloy,
Cr = the weight percent of chromium in the alloy,
Ni = the weight percent of nickel in the alloy, and
Mo = the weight percent of molybdenum in the alloy.

* * * * *